US012688197B2

(12) United States Patent
Telling et al.

(10) Patent No.: US 12,688,197 B2
(45) Date of Patent: Jul. 21, 2026

(54) LARGE LANGUAGE MODEL RESPONSE OPTIMIZATION FOR DATA PIPELINE GENERATION

(71) Applicant: Palantir Technologies Inc., Denver, CO (US)

(72) Inventors: Morten Telling, Copenhagen (DK); Alexander Bailey, London (GB); Richard Burdish, New York, NY (US); Ankit Shankar, San Francisco, CA (US); Matthew Hawes, Denver, CO (US); Codrut Lemeni, London (GB); Nanwei Cai, New York, NY (US); Tiffany Wang, Brooklyn, NY (US); Joseph Rafidi, Mountain View, CA (US); Kamran Khan, London (GB)

(73) Assignee: Palantir Technologies Inc., Aventura, FL (US)

( * ) Notice: Subject to any disclaimer, the term of this patent is extended or adjusted under 35 U.S.C. 154(b) by 0 days.

(21) Appl. No.: 18/827,034

(22) Filed: Sep. 6, 2024

(65) Prior Publication Data
US 2025/0094439 A1 Mar. 20, 2025

Related U.S. Application Data

(60) Provisional application No. 63/583,677, filed on Sep. 19, 2023.

(51) Int. Cl.
*G06F 16/25* (2019.01)
*G06F 16/242* (2019.01)
(52) U.S. Cl.
CPC .......... *G06F 16/258* (2019.01); *G06F 16/243* (2019.01)

(58) Field of Classification Search
CPC ............................ G06F 16/258; G06F 16/243
See application file for complete search history.

(56) References Cited

U.S. PATENT DOCUMENTS

| | | | |
|---|---|---|---|
| 8,443,207 B2 | 5/2013 | Yan et al. | |
| 2006/0100856 A1 | 5/2006 | Kang et al. | |

(Continued)

OTHER PUBLICATIONS

Beurer-Kellner et al., Prompting Is Programming: A Query Language for Large Language Models, Proceedings of the ACM on Programming Languages, vol. 7, Issue PLDI Article No. 186, pp. 1946-1969, Jun. 2023. (Year: 2023).*
U.S. Appl. No. 18/674,672, Large Language Model Response Optimization Using Custom Computer Languages, filed May 24, 2024.

(Continued)

*Primary Examiner* — Cheyne D Ly
(74) *Attorney, Agent, or Firm* — Knobbe, Martens, Olson & Bear, LLP

(57) ABSTRACT

A system may use a large language model ("LLM") to generate a data pipeline. The system can receive a natural language query and a selection of a plurality of data sets for generating a data pipeline and generate a prompt comprising at least: the natural language query, indications of the plurality of data sets, an indication of a format of a first computer language, and an indication of available data transformations. The system can transmit the prompt to an LLM and receive, from the LLM, a response to the prompt in the format of the first computer language. The system can parse the response in the first computer language to identify at least an indication of one or more recommended data transformations. The system can generate, based on the indication of the one or more recommended data transformations, the data pipeline using a second computer language.

20 Claims, 19 Drawing Sheets

(56) References Cited

U.S. PATENT DOCUMENTS

| | | | |
|---|---|---|---|
| 2010/0131275 A1 | 5/2010 | Paek | |
| 2017/0229116 A1* | 8/2017 | Melnikov | G10L 15/1815 |
| 2018/0349377 A1 | 12/2018 | Verma et al. | |
| 2022/0075962 A1 | 3/2022 | Kovarik et al. | |
| 2024/0256764 A1* | 8/2024 | Maschmeyer | G06F 40/205 |
| 2024/0303424 A1 | 9/2024 | Reddy et al. | |
| 2024/0319976 A1* | 9/2024 | Benamu | G06F 21/577 |
| 2024/0330365 A1* | 10/2024 | Zawadowskiy | H04L 63/1483 |
| 2024/0362409 A1 | 10/2024 | Kuan | |
| 2024/0378390 A1* | 11/2024 | Korganyan | G06F 16/951 |
| 2024/0386058 A1 | 11/2024 | Thomas et al. | |
| 2024/0386216 A1* | 11/2024 | Sodhi | G06F 40/40 |
| 2024/0403290 A1 | 12/2024 | Hawes et al. | |
| 2024/0427567 A1* | 12/2024 | Murthy | G06F 16/211 |
| 2025/0005288 A1* | 1/2025 | Amatriain-Rubio | G06F 40/35 |
| 2025/0094171 A1* | 3/2025 | Isaacson | G06F 9/30079 |

OTHER PUBLICATIONS

ANTLR, "What is ANTLR?", Another Tool for Language Recognition, Latest News, https://www.antir.org/, retrieved Jun. 10, 2024.

LangChain Unstructured, "Transforming natural language data from raw to machine learning ready", https://blog.langchain.dev/langchain-unstructured/, Feb. 5, 2023, in 4 pages.

LangChain Unstructured, "Announcing LangChainJS support for multiple JS environments" https://blog.langchain.dev/js-envs/, Apr. 11, 2023, in 6 pages.

Liu, "Combining text-to-SQL with semantic search for retrieval augmented generation"; https://www.llamaindex.ai/blog/combining-text-to-sql-with-semantic-search-for-retrieval-augmented-generation-c60af30ec3b, LlamaIndex, May 28, 2023.

Wang et al., "Grammar prompting for domain-specific language generation with large language models", https://arxiv.org/pdf/2305.19234v1, May 30, 2023, in 24 pages.

* cited by examiner

200

```
232   {
233     "transformVersion": {
234        "major": 1
235     },
236     "transformId": "complexleftJoin",
237     "id": "9f465e04-c1d2-4e26-922d-7fa07e049904",
238     "displayName": "Join",
239     "arguments": {
240        "right": {
241          "primitive": {
242            "transformOutput": {
243              "id": "c4103ab7-7b47-4efc-aa1c-9d53ca7b380b",
244              "parameterId': "dataset"
245            },
246            "type": "transformOutput"
247          },
248          "type": "primitive"
249        },
250        "LeftColumnsToKeep": {
251          "primitive": {
252            "metadataExpression": {
253              "expression": {
254                "id": "97a544b0-cf06-19f3-82e7-47ddc813411b",
255                "expressionId": "allColumns",
256                "expressionVersion": {
257                  "major": 1
258                },
259                "arguments": {}
260              },
261              "type": "expression"
262            },
263            "type": "metadaExpression"
264          },
265          "type": "primitive"
```

FIG. 2A

```
1   READ "address_update" AS addres_update;

2   READ "claims" AS claims;

3   READ "postcodes" AS postcodes;

4   complexLeftJoin left=claims right=address_update joinCondition=equals(left=$"left.claimant_
    id" right=$"right.claimnt_id) leftColumnsTokeep=allColumns()rightColumnsTokeep=columnName_
    IsIn(columnNames=["home_airport"]) rightHandSidePrefix="right_" AS of 5   complexLeftJoin left=claims with_address right=postcodes joinCondition=equals(left=$"
    left.address_postcode" right=$"right.postcode") leftColumnsTokeep=columnNameIsIn(column
    Names=["tail_number" "airline"]) right=right_of rightColumnsTokeep=columnNameIsIn(column
    Names=["home_airport"]) AS of 6   filter dataset=claims_with_region filterCondition=equals(left=$"region_name" right="West
    Midlands") AS west_midlands_claims;

7   WRITE west_midlands_claims AS "output dataset";
```

```
1   grammar Arthur;
2   program : block* writeBlock? EOF;
3
4   block : readBlock
5         | transformBlock;
6
7   readBlock: commentBlock? READ STRING AS dataset SEMICOLON;
8   writeBlock : commentBlock? WRITE dataset AS STRING SEMICOLON;
9   transformBlock : commentBlock? transformId (argument COMA?)*AS ID SEMICOLON;
10
11  parmeter : primitiveParameter | compositeParameter;
12  primitiveParameter : columnExpression | tuple | dataset | enumLiteral
13  compositeParameter : list | set;
14  list : OPEN_SQUARE (primitiveParameter COMMA?)* CLOSE_SQUARE;
15  set : OPEN_CURLY (primitiveParameter COMMA?)* CLOSE_CURLY;
16
17  tuple: OPEN_ROUND primitiveParameter COMMA primitiveParameter CLOSE_ROUND;
18  columnExpression : ID OPEN_ROUND argument* CLOSE_ROUND (AS column)?;
19  structLocator: STRUCT_LOCATOR;
20
21  literal : INT
22          | STRING
23          | bool
24          | DOUBLE;
25
26  bool: TRUE | FALSE;
27  argument: (parameterId EQUALS parameter);
28  TransformId: ID;
29  parameterId: ID;
30  dataset: ID;
31  column : COLUMN;
32  variable: VARIABLE;
33  enumLiteral : BAR SHOUT BAR;
34  commentBlock: LINE_COMMENT*;
```

```
36   SEMICOLON : ';';
37   PERIOD : '.';
38   EQUALS: '=';
39   READ: 'READ';
40   WRITE: 'WRITE';
41   OPEN_ROUND : '(';
42   OPEN_SQUARE : '[';
43   OPEN_CURLY : '{';
44   CLOSE_ROUND : ')';
45   CLOSE_SQUARE : ']';
46   CLOSE_CURLY : '}';
47   INT : '.'? [0-9]+;
48   DOUBLE : '.'? [0-9]+ PERIOD [0-9]+;
49   TRUE : 'true';
50   FALSE : 'false';
51   COLUMN : '$"'(ID'.')?ID'"';
52   STRUCT_LOCATOR : '@' QUOTE ID (PERIOD ID)* QUOTE;
53   VARIABLE : '$$"''ID'"';
54   BAR : '|';
55   AS : 'AS';
56   SHOUT : [A-Z][A-Z0-9_]+;
57   COMMA : ',';
58   ID : [A-Za-z0-9_]+;
59   QUOTE : '"';
60   STRING : QUOTE (~[\r\n"] |'\\"')* QUOTE;
61   WS: [\n\t\r]+ -> skip;
62   LINE_COMMENT: '//" ~[\r\n]*;
```

```
61   Expressions are given in the format expressionId(parameterId ...). This is a full list of all expressions:
62   - add(expressions)
63   name: Add numbers
64   description: Calculates the sum of all input columns.
65   Examples:
66   *With schema: $"col_a""integer", $"col_b" "integer" you could do: add(expressions=[$"col_a" $"col_b"])
67
68   - and(conditions)
69   name: And
70   description: Returns true if all of the specified conditions are true. Nulls are considered false.
71   Examples:
72   *With schema: $"left_boolean" "boolean", $"right_boolean" "boolean" you could do: and(conditions=[$"left_
73
74   - arrayContains(array value)
75   name: Array contains
76   description: Returns true if the array contains the value.
77   Examples:
78   *With schema: $"part_ids" "array<"string">" you could do: arrayContains(array=$"part_ids""value="BRR-123")
79
80   - cast(expression type)
81   name: Cast
82   description: Cast expression to given type.
83   Examples:
84   *With schema: $"a" "array<"struct<foo:"boolean">">" you could do: cast(expression=$"a" type="string")
```

| | |
|---|---|
| 373 | - cbacStringToGroupNames(expression) |
| 374 | name: Parse classification string ⎫ 412d |
| 375 | description: Returns the group name parsed from a given classification string. ⎭ |
| 376 | |
| 377 | - ceil(expression) |
| 378 | name: Ceil ⎫ 412e |
| 379 | description: Returns ceil of a given fractional value. ⎭ |
| 380 | |
| 381 | - cipherDecrypt(cipherLicenseRid expression) |
| 382 | name: Cipher decrypt ⎫ 412f |
| 383 | description: Decrypts expression with cipher. ⎭ |
| 384 | |
| 385 | - cipherEncrypt(cipherLicenseRid expression) |
| 386 | name: Cipher encrypt ⎫ 412g |
| 387 | description: Encrypts expression with cipher. ⎭ |

| | |
|---|---|
| 367 | These are example of common mistakes when using the expression: |
| 368 | // Casting to date from string is not allowed, use stringToDate insted. |
| 369 | // Casting to timestamp from string is not allowed, use stringToTimestamp |
| 370 | // Casting to string from data is not allowed, use dateToString instead. |
| 371 | // Casting to string from timestamp is not allowed, use timestampToString Instead. |

| | |
|---|---|
| 205 | ~ complexCrossJoin left leftColumnsToKeep right rightColumnsToKeep |
| 206 | name: Cross join |
| 207 | desription: Cross joins Left and right dataset inputs togetherExamples: |
| 208 | *Schema: |
| 209 | $"tail_number": "string", $"airline": "string", $"miles": "long", $ |
| 210 | Schema: |
| 211 | $"tail_number": "string", $"home_airport": "string" |
| 212 | You could do: complexCrossJoin left=left_df leftColumnsTokeep=colum |
| 213 | *Schema: |
| 214 | $"tail_number": "string", $"airline": "string" $"miles": "long", $"f |
| 215 | Schema: |
| 216 | $"tail_number": "string", $"home_airport": "string" |
| 217 | You could do: complexCrossJoin left=left_df leftColumnsTokeep=colum |
| 218 | |

504a

| | |
|---|---|
| 219 | - complexLeftJoin joinCondition left leftColumnsToKeep right rightColumns |
| 220 | name: Left join |
| 221 | desription: Left joins left and right dataset inputs togetherExamples: |
| 222 | *Schema: |
| 223 | $"tail_number": "string", $"airline": "string", $"miles": "long", $ |
| 224 | Schema: |
| 225 | $"tail_number": "string", $"home_airport": "string" |
| 226 | You could do: complexLeftJoin joinCondition=equals(left=$"left.tail |
| 227 | *Schema: |
| 228 | $"tail_number": "string", $"airline": "string" $"miles": "long", $"factor" |
| 229 | Schema: |
| 230 | $"tail_number": "string", $"home_airport": "string" |
| 231 | You could do: complexLeftJoin joinCondition=equals(left=$"left.tai |
| 232 | |

504b

| | |
|---|---|
| 233 | - filter dataset filterCondition |
| 234 | name: Filter |
| 235 | desription: Filters the input dataset based on the specified filter condition. |
| 236 | *Schema: |
| 237 | $"recently_serviced": "boolean", $"tail_number": "string" |
| 238 | You could do: filter dataset=dataset_df filterCondition=$"recently_ |

```
 68    _ flattenStruct dataset expression maxDepth prefix separator
 69   name: Flatten struct
 70   description: Take all fields in a struct and turn them into columns in the output dataset.
 71
 72   - geoDistanceInnerJoin distance distanceCrs joinKeys left le
 73   name: Geo distance inner join
 74   description: Inner joins left and right datasets together based on the distance between
 75
 76   - geoDistanceLeftJoin distance distanceCrs joinKeys left leftColumns
 77     name: Geo distance left join
 78      description: Left joins datasets together if the distance between
 79
 80   - geoIntersectionInnerJoin joinKeys left leftColumnsToKeep right
 81   name: Geo intersection inner join
 82   description: Inner joins left and right datasets together based on whether input
 83
 84   - geoIntersectionJoin joinKey left right
 85   name: Geometry intersection join
 86   description: Inner joins left and right datasets together based on
 87
 88   - geoIntersectionLeftjoin joinKeys left leftColumnsToKeep right rightColumns
 89   name: Geo intersection left join
 90   description: Left joins input datasets based on whether input
 91
 92   - geoKnnInnerJoin distanceCrs joinKeys k left leftColumnsToKeep right rightColumns
 93   name: Geometry knn inner join
 94     description: Selects the k closest points from the neighbors dataset for each
 95
 96   - geoKnnLeftJoin distanceCrs joinKeys k left leftColumnsToKeep right rightColumns
 97   name: Geometry knn inner join
 98   description: Selects the k closest points from the neighbors dataset for each
 99
100   - getManyStructFields dataset locators struct
101   name: Extract many struct fields
102   description: Extracts many fields from a struct. Original struct will be dropped.
103
104   - keyBy dataset keyByColumns
105   name: key by
106   description: Keys the input by the provided key by columns. Note that this does not
```

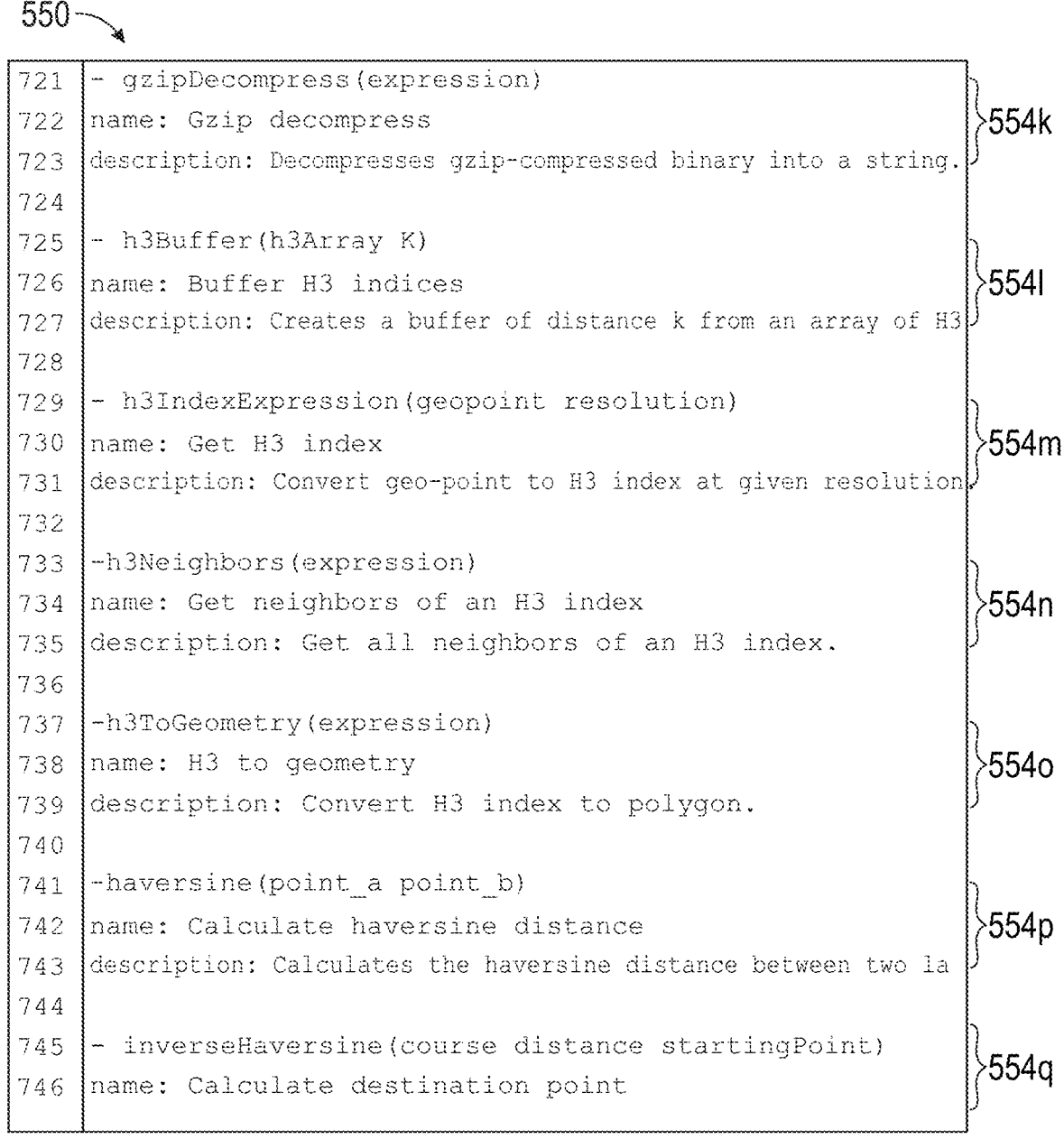

```
721  - gzipDecompress(expression)
722  name: Gzip decompress                                            } 554k
723  description: Decompresses gzip-compressed binary into a string.
724
725  - h3Buffer(h3Array K)
726  name: Buffer H3 indices                                          } 554l
727  description: Creates a buffer of distance k from an array of H3
728
729  - h3IndexExpression(geopoint resolution)
730  name: Get H3 index                                               } 554m
731  description: Convert geo-point to H3 index at given resolution
732
733  -h3Neighbors(expression)
734  name: Get neighbors of an H3 index                               } 554n
735  description: Get all neighbors of an H3 index.
736
737  -h3ToGeometry(expression)
738  name: H3 to geometry                                             } 554o
739  description: Convert H3 index to polygon.
740
741  -haversine(point_a point_b)
742  name: Calculate haversine distance                              } 554p
743  description: Calculates the haversine distance between two la
744
745  - inverseHaversine(course distance startingPoint)
746  name: Calculate destination point                               } 554q
```

```
256  You are allow to use the same expression or transform more than
257  Expressions should ALWAYS be written..as..expressionId(parameter     ⎫
258  e.g. max(expression=$"column_name")                                   ⎬  602
259       trim(expression=$"col")                                          ⎭
260  dateSub(start=$"col" value=1 dateUnit={MONTHS})
443  Transforms should always be written as 'transformId parameterId       ⎫
444  e.g - unionByName datasetsToUnion={df1 df2 df3} AS unioned            ⎬  604
445       - drop dataset=df columnsToDrop={$"a" $"b"} AS dropped           ⎭
446  All actions must include code written must always respect the ◄         608
447
448  Here are some examples of user queries and their generated pipelines:
449  - Example:
450  Data:
451  Name: "Facilities dataset"
452  $"ID": string
453  $"description": string
454  $"start_data": date
455  $"end_date": date)
456  Query: Count rows by id
457  Response:
458  General thought: I need to count the number of rows in a data
459  Thought 1: I need to read the facilities dataset
460  Act 1: <code>READ "Facilities dataset" AS df;</code>
461  Observation 1: I have a dataset called of
462  Thought 2: I need to Aggregate on column ID and compute row count
463  Act 2: <code>
464  // Aggregate row count by ID
465  aggregate dataset=df aggregations={rowCount() AS $"count"}
466  </code>
467  Observation 2: I have a dataset called df which counts rows by id.
468  Thought 3: I finished the logic so I need to write the dataset
469  Act 3: <code>
470  WRITE df AS "Facilities dataset";
471  </code>
472  Observation 3: I wrote the dataset.
473  - Example:
474  Data:
475  Name: "Facilities dataset"
476  $"ID": string
```

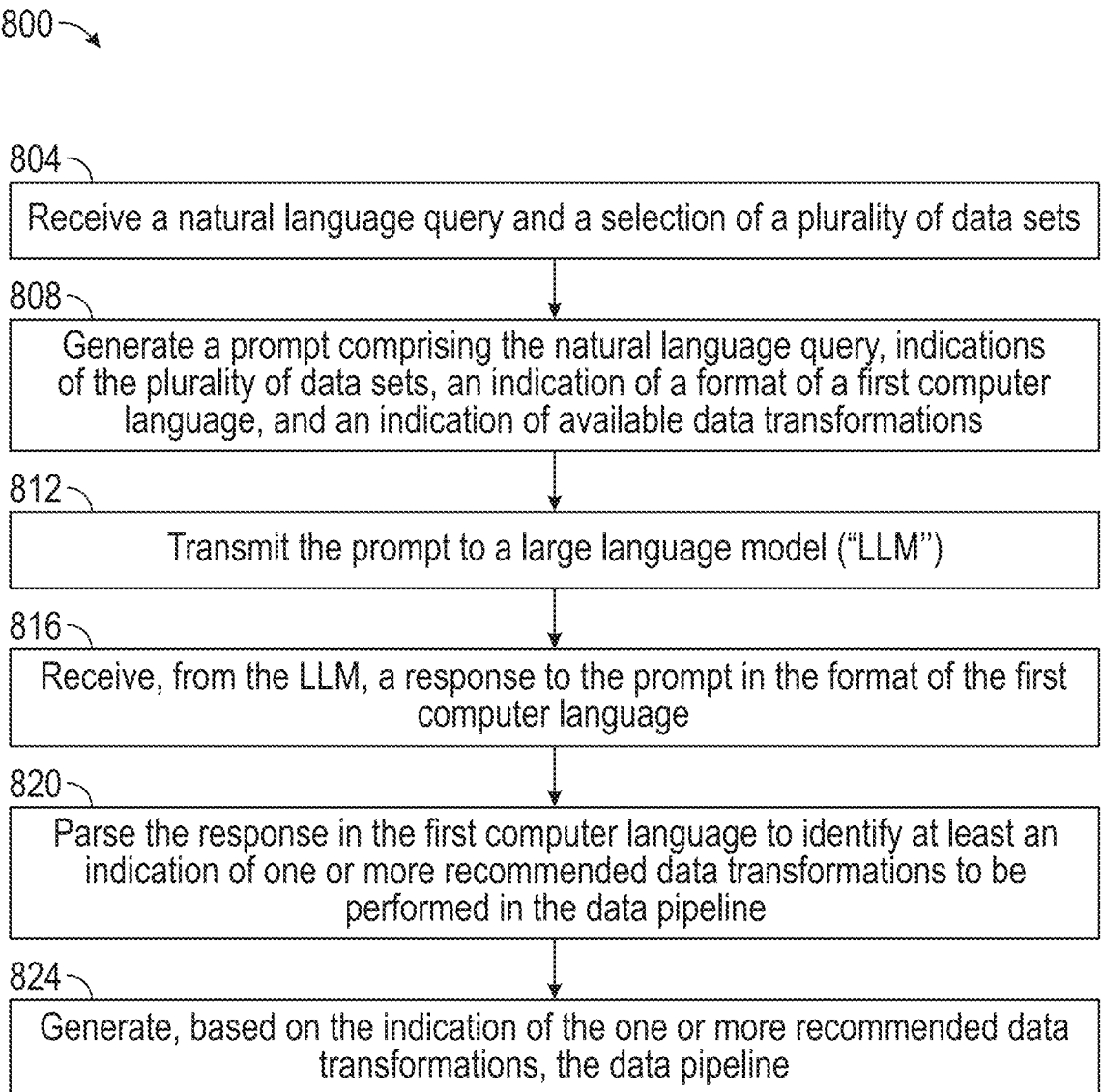

800

804
Receive a natural language query and a selection of a plurality of data sets 808
Generate a prompt comprising the natural language query, indications of the plurality of data sets, an indication of a format of a first computer language, and an indication of available data transformations 812
Transmit the prompt to a large language model ("LLM")

816
Receive, from the LLM, a response to the prompt in the format of the first computer language 820
Parse the response in the first computer language to identify at least an indication of one or more recommended data transformations to be performed in the data pipeline 824
Generate, based on the indication of the one or more recommended data transformations, the data pipeline

FIG. 8

LARGE LANGUAGE MODEL RESPONSE OPTIMIZATION FOR DATA PIPELINE GENERATION

CROSS-REFERENCE TO RELATED APPLICATIONS

This application claims benefit of U.S. Provisional Patent Application No. 63/583,677, filed Sep. 19, 2023, and titled "LARGE LANGUAGE MODEL RESPONSE OPTIMIZATION FOR DATA PIPELINE GENERATION." The entire disclosure of each of the above items is hereby made part of this specification as if set forth fully herein and incorporated by reference for all purposes, for all that it contains.

Any and all applications for which a foreign or domestic priority claim is identified in the Application Data Sheet as filed with the present application are hereby incorporated by reference under 37 CFR 1.57 for all purposes and for all that they contain.

TECHNICAL FIELD

Implementations of the present disclosure relate to systems and techniques for optimization of responses from large language models. More specifically, implementations of the present disclosure relate to computerized systems and techniques for using a custom computer language for generating data pipelines using large language models.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Computers can be programmed to perform calculations and operations utilizing one or more computer-based models. Various techniques have been developed to minimize the effort required by a human user in adapting and reprogramming the computer for utilizing such computer-based models.

SUMMARY

The systems, methods, and devices described herein each have several aspects, no single one of which is solely responsible for its desirable attributes. Without limiting the scope of this disclosure, several non-limiting features will now be described briefly.

Computer-based models (generally referred to herein as "models") have become important tools in assisting human users in manipulating data and generating outputs based on that data. For example, human users may generate data pipelines, which can include a plurality of data sets that have relationships with each other. A data pipeline can be created as a result of one or more transforms performed on those data sets. For example, a data pipeline can be created in response to the data sets being joined together, separated, compared, added to, subtracted from, modified in some other way, and/or some combination of these. Historically, pipelines have been created using conventional computer languages that require highly complex nesting structures, strict grammatical requirements, and/or other formatting limitations that reduce or prevent the use of these data pipelines with these models.

These models, which include large language models ("LLMs"), are generally optimized to receive queries or prompts in natural language. However, these languages may not provide accurate or helpful responses in response to prompts that are prepared in the conventional computer languages in which pipelines have historically been managed. This problem is especially evident when the prompt and/or the response are formatted in a format that includes highly nested-logic syntax, such as JSON. JSON often requires a series of nested characters (e.g., curly brackets or braces) to properly express certain logical instructions. Computer-based models, including LLMs, may not be optimized to provide outputs with such syntax. In some cases, prompts prepared using these conventional computer languages can require far more "tokens" (e.g., a measurement of length of a prompt) than natural language prompts, often even exceeding a maximum number of tokens acceptable by the LLM. Moreover, prompts in conventional computer languages are more prone to error due to the unique function of LLMs. These models may not be able to satisfactorily manage the logic of the specified format in the output while also managing the logic and/or demands of the substance of the prompt itself. For example, LLMs may not be able to consistently store all of the specific relational information within a nested structure while also performing the other substantive aspects of the prompt. Moreover, LLMs may hallucinate (e.g., generate creative but false information) under certain circumstances, such as when the LLM misinterprets a portion of the prompt.

Various combinations of the features, embodiments, implementations, and aspects recited herein are also disclosed and contemplated by the present disclosure. Additional implementations of the disclosure are described below in reference to the appended claims, which may serve as an additional summary of the disclosure.

In various implementations, systems and/or computer systems are disclosed that comprise one or more computer-readable storage mediums comprising program instructions, and one or more processors configured to execute the program instructions to cause the systems and/or computer systems to perform operations comprising one or more aspects of the above- and/or below-described implementations (including one or more aspects of the appended claims).

In various implementations, computer-implemented methods are disclosed in which, by one or more processors executing program instructions, one or more aspects of the implementations described herein (including one or more aspects of the appended claims) are implemented and/or performed.

In various implementations, computer program products comprising one or more computer-readable storage mediums are disclosed, wherein the computer-readable storage mediums comprising program instructions, the program instructions executable by one or more processors to cause the one or more processors to perform operations comprising one or more aspects of the implementations described herein (including one or more aspects of the appended claims).

BRIEF DESCRIPTION OF THE DRAWINGS

The following drawings and the associated descriptions are provided to illustrate implementations of the present disclosure and do not limit the scope of the claims. Aspects and many of the attendant advantages of this disclosure will become more readily appreciated as the same become better understood by reference to the following detailed description, when taken in conjunction with the accompanying drawings.

FIG. 2A shows an example set of code for executing a transformation, using a conventional language instruction.

FIG. 2B shows another example of a custom computer language instruction, according to some embodiments.

FIG. 3A shows an example of a first parser initializer, according to some embodiments.

FIG. 3B shows additional a second parser initializer, which may be included with the first parser initializer.

FIG. 4A shows an expression initializer, which can be a portion of a prompt, according to certain embodiments.

FIG. 4B shows additional examples of expressions.

FIG. 4C shows an example mistake context instruction, according to some examples.

FIG. 5A shows an example transformation initializer that may be included in a prompt to be sent to the LLM, according to some embodiments.

FIGS. 5B-5C show other example transformation initializers that can be used to initialize geo-specific transformations.

FIG. 6 shows an example prompt context instruction that may be provided as part of the full prompt, according to some examples.

FIG. 8 shows an example of a method for generating a data pipeline using an LLM.

DETAILED DESCRIPTION

Figure 1:
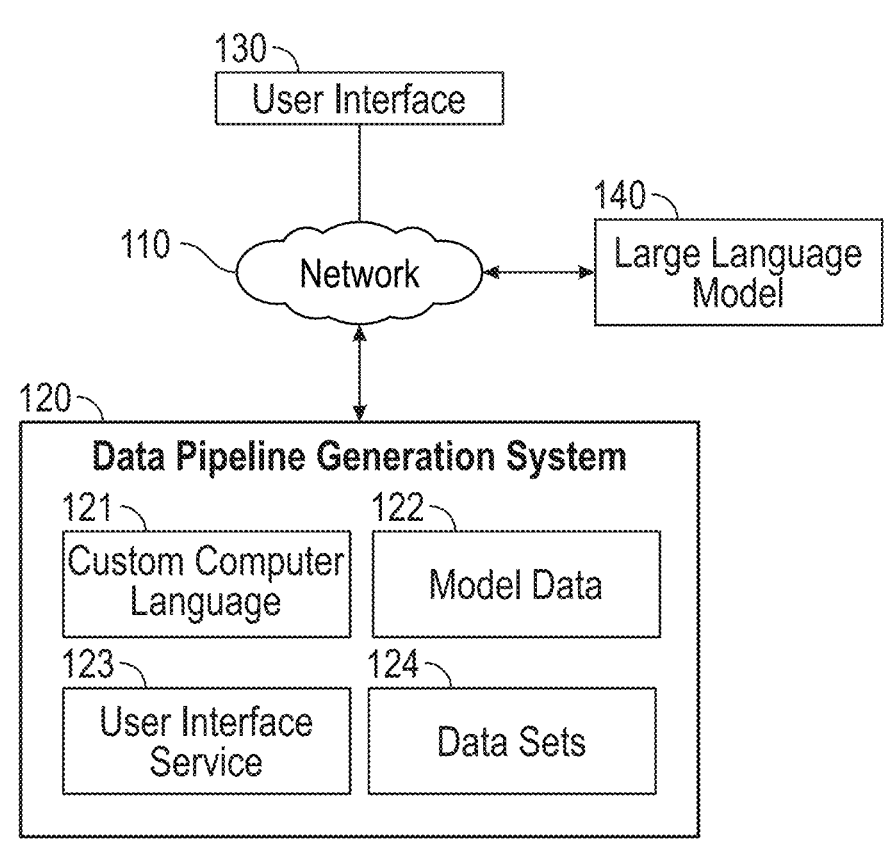
FIG. 1 illustrates an example computing environment including a data pipeline generation system.

Although certain preferred implementations, embodiments, and examples are disclosed below, the inventive subject matter extends beyond the specifically disclosed implementations to other alternative implementations and/or uses and to modifications and equivalents thereof. Thus, the scope of the claims appended hereto is not limited by any of the particular implementations described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain implementations; however, the order of description should not be construed to imply that these operations are order dependent. Additionally, the structures, systems, and/or devices described herein may be embodied as integrated components or as separate components. For purposes of comparing various implementations, certain aspects and advantages of these implementations are described. Not necessarily all such aspects or advantages are achieved by any particular implementation. Thus, for example, various implementations may be carried out in a manner that achieves or optimizes one advantage or group of advantages as taught herein without necessarily achieving other aspects or advantages as may also be taught or suggested herein.

Overview

Computer-based models (generally referred to herein as "models") have become important tools in assisting human users in manipulating data and generating outputs based on that data. For example, human users may generate data pipelines, which can include a plurality of data sets that have relationships with each other. A data pipeline can be created as a result of one or more transforms performed on those data sets. For example, a data pipeline can be created in response to the data sets being joined together, separated, compared, added to, subtracted from, modified in some other way, and/or some combination of these. Historically, data pipelines have been created using conventional computer languages that require highly complex nesting structures, strict grammatical requirements, and/or other formatting limitations that reduce or prevent the use of these data pipelines with these models. The data pipeline can be a visual display of a relationship among data sets. Additionally or alternatively, the data pipeline may be the execution of code to create the relationship among the data sets so that the relationship can be used for additional purposes.

These models, which include large language models ("LLMs"), are generally optimized to receive queries or prompts in natural language. However, these languages may not provide accurate or helpful responses in response to prompts that are prepared in the conventional computer languages in which pipelines have historically been managed. This problem is especially evident when the prompt and/or the response are formatted in a format that includes highly nested-logic syntax, such as JSON. JSON often requires a series of nested characters (e.g., curly brackets or braces) to properly express certain logical instructions. Computer-based models, including LLMs, may not be optimized to provide outputs with such syntax. In some cases, prompts prepared using these conventional computer languages can require far more "tokens" (e.g., a measurement of length of a prompt) than natural language prompts, often even exceeding a maximum number of tokens acceptable by the LLM. Moreover, prompts in conventional computer languages are more prone to error due to the unique function of LLMs. These models may not be able to satisfactorily manage the logic of the specified format in the output while also managing the logic and/or demands of the substance of the prompt itself. For example, LLMs are may not be able to consistently store all of the specific relational information within a nested structure while also performing the other substantive aspects of the prompt. Moreover, LLMs may hallucinate (e.g., generate creative but false information) under certain circumstances, such as when the LLM misinterprets a portion of the prompt.

The systems and methods described herein may improve interactions with the LLM by reducing a number of "tokens" (e.g., characters or sets of characters) present in or required for a prompt to the LLM. Some LLMs allow only a certain number of tokens per query or prompt. Thus, a custom computer language that can reduce a total number of tokens may allow interactions with the LLM that were previously impossible based on the number of tokens needed to present the target prompt. Additionally or alternatively, reducing a number of tokens may increase a complexity of prompt that can be presented to the LLM. Thus, the custom computer languages described herein can allow prompts to be presented in fewer tokens. This can result in a higher token density (e.g., arguments per token, instructions per token). The increased token density can be as high as 2×, 5×, 10×, 50×, and sometimes even over 100×, compared to a conventional computer language token density, depending on the nature of the prompt. For example, a higher token density will be expected from the custom computer language if a highly nested or highly ordered conventional computer language is being replaced.

For example, the custom computer languages described herein can reduce the number of interactions with the LLM that are required. For example, the custom computer language can cause the LLM to address multiple needs in the same prompt, rather than requiring a plurality of sequential prompts. The custom computer language may allow for named entities that can be referenced later in the same or later prompt. This may not be possible with relevant conventional computer languages to be replaced by the custom computing language. This can improve the token density of the prompt and/or improve the readability (e.g., by a custom computer language parser, by a human) of the LLM response. The named entities can result in more compact expressions, more understandable expressions, and/or higher accuracy of the prompts and/or responses.

Because the LLM is able to make certain language inferences, the custom computer language can include inferences that do not explicitly identify a specific type or typing of expressions, variables, arguments, or other elements of the prompt. For example, an argument in a custom computer language may be descriptive of the function of the argument or of its location among the other elements (e.g., arguments, variables, expressions) so that the LLM can reliably and accurately infer relevant information about the element. The LLM can efficiently infer types of elements based on the descriptive nature of the custom computer language. Accordingly, the custom computer language implements such descriptive terms because the LLM is able to infer the function of the element. Additionally or alternatively, a parser may be able to infer those implicit types/typings in the LLM responses that are in the custom computer language. Such types/typings may be referred to as "inferred" or "implicit" elements (e.g., inferred element types, implicit arguments, inferred arguments, etc.).

The present disclosure includes a system, methods, and software (generally referred to herein as "the system") for providing improved (including more accurate and more efficient) interactions with LLMs. The present disclosure further includes various processes, functionality, and interactive graphical user interfaces related to the system. According to various implementations, the system (and related processes, functionality, and/or interactive graphical user interfaces), includes one or more custom computer languages (which can include specific syntax and formatting) that are advantageously optimized for LLM interactions.

Using a combination of examples and instructions, these models can be prepared (e.g., within the prompt) to respond in the desired format, such as in a custom computer language. The desired format can specify relationships among data elements, such as data nodes, in a format that is more compact (e.g., uses fewer tokens) and/or precise, yet still understandable by an LLM. The system can instruct the LLM to output responses in an optimized custom computer language that is both clear for a computer to parse, but also relatively close to natural language so that the LLM can handle it better.

The custom computer language may be a combination of structured code, pseudocode, and/or natural language. The custom computer language use keywords that are close to natural language (e.g., common root word, different capitalization) but may include some parsable structure to give a higher level of precision than natural language. However, the custom computer language can rely on a format (e.g., syntax, terminology, and/or grammatical structure) that is more flexible and/or simpler than JSON or other grammatically rigid languages such as many conventional computer languages. The looser format may make the custom computer language easier for the LLM to understand. The custom computer language can succinctly and elegantly identify relationship information for data sets in a way that is substantially context-free. By comparison, many conventional computer languages require complex nesting structures to identify relationship information.

The system may include in its prompts explicit examples for how to interpret the custom computer language. For example, the system can provide a list of possible syntaxes (e.g., punctuation, spellings, capitalizations, word orderings), example terms for fulfilling certain commands, and/or example commands using the possible syntaxes and terms together. The system can include instructions for how the LLM should format the response to be in the custom computer language. The system can receive a selection of data sets for which the data pipeline is to be created and a user prompt for performing one or more transforms on those data sets. The system can provide examples of transforms that may be performed on those data sets to create the data sets.

To facilitate an understanding of the systems and methods discussed herein, several terms are described below. These terms, as well as other terms used herein, should be construed to include the provided descriptions, the ordinary and customary meanings of the terms, and/or any other implied meaning for the respective terms, wherein such construction is consistent with context of the term. Thus, the descriptions below do not limit the meaning of these terms, but only provide example descriptions.

The term "model," as used in the present disclosure, can include any computer-based models of any type and of any level of complexity, such as any type of sequential, functional, or concurrent model. Models can further include various types of computational models, such as, for example, artificial neural networks ("NN"), language models ("LMs") (e.g., large language models ("LLMs")), artificial intelligence ("AI") models, machine learning ("ML") models, multimodal models (e.g., models or combinations of models that can accept inputs of multiple modalities, such as images and text), and/or the like.

A Language Model ("LM") is any algorithm, rule, model, and/or other programmatic instructions that can predict the probability of a sequence of words. A language model may, given a starting text string (e.g., one or more words), predict the next word in the sequence. A language model may calculate the probability of different word combinations based on the patterns learned during training (based on a set of text data from books, articles, websites, audio files, etc.). A language model may generate many combinations of one or more next words (and/or sentences) that are coherent and contextually relevant. Thus, a language model can be an advanced artificial intelligence algorithm that has been trained to understand, generate, and manipulate language. A language model can be useful for natural language processing, including receiving natural language prompts and providing natural language responses based on the text on which the model is trained. A language model may include an n-gram, exponential, positional, neural network, and/or other type of model.

A Large Language Model ("LLM") is any type of language model that has been trained on a larger data set and has a larger number of training parameters compared to a regular language model. An LLM can understand more intricate patterns and generate text that is more coherent and contextually relevant due to its extensive training. Thus, an LLM may perform well on a wide range of topics and tasks. LLMs may work by taking an input text and repeatedly predicting the next word or token (e.g., a portion of a word, a combination of one or more words or portions of words, punctuation, and/or any combination of the foregoing and/or the like). An LLM may be of any type, including a Question Answer ("QA") LLM that may be optimized for generating answers from a context, a multimodal LLM/model, and/or the like. An LLM (and/or other models of the present disclosure) may include, for example, a NN trained using self-supervised learning and/or semi-supervised learning, a feedforward NN, a recurrent NN, and/or the like. An LLM (and/or other models of the present disclosure) may further include, for example, attention-based and/or transformer architecture or functionality.

While certain aspects and implementations are discussed herein with reference to use of a language model, LLM, and/or AI, those aspects and implementations may be performed by any other language model, LLM, AI model, generative AI model, generative model, ML model, NN, multimodal model, and/or other algorithmic processes. Similarly, while certain aspects and implementations are discussed herein with reference to use of a ML model, those aspects and implementations may be performed by any other AI model, generative AI model, generative model, NN, multimodal model, and/or other algorithmic processes.

In various implementations, the LLMs and/or other models (including ML models) of the present disclosure may be locally hosted, cloud managed, accessed via one or more Application Programming Interfaces ("APIs"), and/or any combination of the foregoing and/or the like. Additionally, in various implementations, the LLMs and/or other models (including ML models) of the present disclosure may be implemented in or by electronic hardware such application-specific processors (e.g., application-specific integrated circuits ("ASICs")), programmable processors (e.g., field programmable gate arrays ("FPGAs")), application-specific circuitry, and/or the like. Data that may be queried using the systems and methods of the present disclosure may include any type of electronic data, such as text, files, documents, books, manuals, emails, images, audio, video, databases, metadata, positional data (e.g., geo-coordinates), geospatial data, sensor data, web pages, time series data, and/or any combination of the foregoing and/or the like. In various implementations, such data may comprise model inputs and/or outputs, model training data, modeled data, and/or the like.

Examples of models, language models, and/or LLMs that may be used in various implementations of the present disclosure include, for example, Bidirectional Encoder Representations from Transformers (BERT), LaMDA (Language Model for Dialogue Applications), PaLM (Pathways Language Model), PaLM 2 (Pathways Language Model 2), Generative Pre-trained Transformer 2 (GPT-2), Generative Pre-trained Transformer 3 (GPT-3), Generative Pre-trained Transformer 4 (GPT-4), LLAMA (Large Language Model Meta AI), and BigScience Large Open-science Open-access Multilingual Language Model (BLOOM).

A data store can be any computer-readable storage medium and/or device (or collection of data storage mediums and/or devices). Examples of data stores include, but are not limited to, optical disks (e.g., CD-ROM, DVD-ROM, and the like), magnetic disks (e.g., hard disks, floppy disks, and the like), memory circuits (e.g., solid state drives, random-access memory (RAM), and the like), and/or the like. Another example of a data store is a hosted storage environment that includes a collection of physical data storage devices that may be remotely accessible and may be rapidly provisioned as needed (commonly referred to as "cloud" storage).

A database can be any data structure (and/or combinations of multiple data structures) for storing and/or organizing data, including, but not limited to, relational databases (e.g., Oracle databases, PostgreSQL databases, MySQL databases and the like), non-relational databases (e.g., NoSQL databases, and the like), in-memory databases, spreadsheets, as comma separated values ("CSV") files, extensible markup language ("XML") files, TeXT ("TXT") files, flat files, spreadsheet files, and/or any other widely used or proprietary format for data storage. Databases are typically stored in one or more data stores. Accordingly, each database referred to herein (e.g., in the description herein and/or the figures of the present application) can be understood as being stored in one or more data stores. Additionally, although the present disclosure may show or describe data as being stored in combined or separate databases, in various implementations such data may be combined and/or separated in any appropriate way into one or more databases, one or more tables of one or more databases, and/or the like.

A data object or object (also referred to herein as data entities or entities) can be a data container for information representing a specific thing in the world that have a number of definable properties. For example, a data object can represent an entity such as a person, a place, an organization, a market instrument, or other noun. A data object can represent an event that happens at a point in time or for a duration. A data object can represent a document or other unstructured data source such as an e-mail message, a news report, or a written paper or article. Each data object may be associated with a unique identifier that uniquely identifies the data object. The object's attributes (e.g., metadata about the object) may be represented in one or more properties. Attributes may include, for example, a geographic location associated with the item, a value associated with the item, a probability associated with the item, an event associated with the item, and so forth.

The system may comprise one or more interactive graphical user interfaces ("GUIs") configured to allow a user to create and/or input prompts to the computer model and/or to receive a response to the prompts. The GUI may be presented by a display to a user.

In some implementations, the system may further include one or more Large Language Models ("LLMs") to allow for more flexible interaction, such as through receiving natural language instructions, with a user of the system. In some implementations, the system may receive a request from a user to generate a new process. The request may be in natural language form. The system may then apply the request to the LLM to generate a desired response. The LLM may provide a result of the analysis of the request. As discussed below, the response may be in a format of a target (e.g., custom) computer language.

In some implementations, the system may receive a request from a user (e.g., a prompt from the user), comprising a natural language description of a notional process. The system may then, using the LLM, generate the notional process comprising one or more states and one or more transitions.

According to various implementations, the system can incorporate and/or communicate with one or more LLMs to perform various functions. Such communications may include, for example, a context associated with an aspect or analysis being performed by the system, a user-generated prompt, an engineered prompt, prompt and response examples, example or actual data, and/or the like. For example, the system may employ an LLM, via providing an input to, and receiving an output from, the LLM. The output from the LLM may be parsed and/or a format of the output may be updated to be usable for various aspects of the system.

The system may employ an LLM to, for example, determine a modeling objective (e.g., based on one or more models and/or other information), identify additional models that may be related to the modeling objective, determine or generate a model location, determine or generate a model adapter configuration, determine or generate a sandbox or container implementation, and/or the like.

Example System and Related Computing Environment

FIG. 1 illustrates an example computing environment 100 including a data pipeline generation system 120 (referred to herein as "system 120" or possibly simply "system"). The system 120 may include custom computer language 121, model data 122, a user interface service 123, and one or more data sets 124. The system 120 may be connected via network 110 to other computing devices, such as user device(s) 130 and/or large language model 140. The system may interact via the network 110 with the large language model 140. For example, the user device(s) 130 may transmit a request to the system 120, to execute a prompt using the large language model 140. The system 120 may receive the request from the user device(s) 130 and in response and/or transmit a request to the large language model 140 to execute one or more large language model 140. The large language model 140 may receive the request from the system 120 and in response, transmit to the user device(s) 130 and/or the system 120, information based on the results of analysis by the large language model 140. In some implementations, the data pipeline generation system 120 includes the large language model 140. In some implementations, the example computing environment may include multiple large language models 140, which may be included internal and/or external to the data pipeline generation system 120, in any combination. Additionally or alternatively, the data sets 124 may be stored external to the data pipeline generation system 120 in some implementations.

The custom computer language 121 can include details used for a prompt to the LLM, such as commands, examples, grammatical structure or other features of a custom computer language, and/or other features described below. For example, the custom computer language 121 can include how an LLM response should be formatted. The custom computer language 121 can include specifications of how the custom computer language should be understood by an LLM, what certain terms mean in the custom computer language, examples of acceptable commands in the custom computer language, examples of sentences and/or arguments in the custom computer language, examples of acceptable syntax (e.g., punctuation, word order, capitalization, etc.) in the custom computer language, and/or other details related to the custom computer language described herein. The custom computer language 121 can include a parsing language. The custom computer language 121 may include a system configured to execute the parser to parse a response from the LLM.

Model data 122 can include object data representing characteristics of one or more models within the system 120. Additionally, and/or alternatively, model data 122 can include object data representing characteristics of associated models hosted on third-party platforms, such as the large language model 140.

The user interface service 123 may allow the system 120 to interact with the user. The user interface service 123 may generate a graphical user interface ("GUI") displayed on a client device, such as user device(s) 130. User interface service 123 may also receive data entered by a user into a client device, such as user device(s) 130, and may store and/or forward it to the other various components of the system 120.

Users may use user device(s) 130 to view and/or interact with a GUI provided by the user interface service 123. For example, the user device(s) 130 can include a wide variety of computing devices, including personal computing devices, terminal computing devices, laptop computing devices, tablet computing devices, electronic reader devices, mobile devices (e.g., desktop computer, notebook computer, smartphone, or any other type of computing device) and associated software (e.g. a browser capable of rendering output from information provided by, for example, user interface service 123).

The large language model 140 can be a third-party server and/or data store implemented as a computer system having logical elements. In an implementation, the logical elements may comprise program instructions recorded on one or more machine-readable storage media. Alternatively, the logical elements may be implemented in hardware, firmware, or a combination thereof. The large language model 140 may include one or more modules. In one example, the large language model 140 can include large language model 140. Large language model 140 can be located external to the system 120, for example within one or more large language model 140.

The data sets 124 can include one or more sets of strings, nodes, arrays, data structures, objects, pointers, and/or other data types in a memory of the data pipeline generation system 120. The data sets 124 may include data that can be combined to form new data sets. The new data sets can be created as a portion of a larger data pipeline. The term "data pipeline" can refer to a flow of data from a source system (e.g., the data pipeline generation system 120, a related system) through intermediate datasets to ultimately produce curated datasets that can be structured into an ontology and/or serve as a foundation of machine learning and analytical workflows. Any two datasets may be connected together via logical transformations (or "transforms" or "data transforms" or "data transformations"). Additionally or alternatively, a "data pipeline" can broadly refer to a relationship among different data sets, the logical connections therebetween, any resulting new data sets, and/or the display of the same. One or more remote computing devices (not shown in FIG. 1) may be connected to the data pipeline generation system 120 via the network 110. In response to being passed information, the data sets 124 can output an answer (e.g., an answer to a query or prompt).

The network 110 can include any one or more communications networks, such as the Internet. The network 110 may be any combination of local area networks ("LAN") and/or a wireless area networks ("WAN") or the like. Accordingly, various components of the computing environment 100, including the system 120, can communicate with one another directly or indirectly via any appropriate communications links and/or networks, such as network 110 (e.g., one or more communications links, one or more computer networks, one or more wired or wireless connections, the Internet, any combination of the foregoing, and/or the like). Similarly, the various components (e.g., as described below) of the system 120 and the computing environment 100 may, in various implementations, communicate with one another directly or indirectly via any appropriate communications links (e.g., one or more communications links, one or more computer networks, one or more wired or wireless connections, the Internet, any combination of the foregoing, and/or the like). FIG. 7, described below, provides additional examples of aspects of implementations of such components of the computing environment 100, the system 120, and the like.

As shown in FIG. 1, the data pipeline generation system 120 and the large language model 140 may each send and/or receive information via the network 110. For example, the data pipeline generation system 120 may submit a query and/or prompt to the large language model 140 (e.g., via the network 110) and receive (e.g., via the network 110) the response from the large language model 140. The terms "query" and "prompt" may sometimes be used interchangeably. Generally, a natural language query includes a user-selected string corresponding to a kind of request or question. Generally, a prompt may include the natural language query and may further include examples of a format of the custom computer language (e.g., as described herein), additional details related to the natural language query, such as how the LLM should consider the natural language query, how the LLM should tackle the prompt, how the LLM should frame the prompt, and/or other details related to the natural language query and/or the prompt. The natural language query may be relatively short (e.g., a string of a few characters and/or tokens). By contrast, the prompt may be hundreds or thousands of characters and/or tokens long.

This send-receive interaction may be repeated multiple times. For example, the data pipeline generation system 120 may submit multiple prompts to the large language model 140 and receive a corresponding number of responses from the large language model 140. The multiple prompts may be modified or updated based on a previous response from the large language model 140. For example, as explained below, the data pipeline generation system 120 may improve or optimize one or more aspects of the custom computer language 121 in response to a determination that a prompt resulted in one or more mistakes in the response from the large language model 140. Additionally or alternatively, the data pipeline generation system 120 may interact with the large language model 140 sequentially to obtain data over the course of multiple, step-by-step send-receive interactions.

The custom computer language can include a syntax and/or other formatting aspects that are intuitive to a human user (or more intuitive than other computer languages, such as conventional computer languages like JSON). The custom computer language may include some formatting elements (e.g., syntax, terminology) that are somewhat more constrained than natural language, which may allow for more compact responses and/or specific responses and/or prompts than either natural language or conventional computer languages alone can provide.

Custom Computer Language for Prompt and Response

The system can instruct the LLM to output responses in an optimized custom computer language that is both clear for a computer to parse, but also relatively close to natural language so the LLM can handle it better. The custom computer language may be a combination of a structured code or pseudocode, and a natural language. The proposed custom computer language may include structured code or pseudocode, using keywords that are close to natural language (e.g., common root word, different capitalization), and with some parsable structure to give a higher level of precision than natural language. However, the custom computer language can rely on a format (e.g., syntax, terminology, and/or grammatical structure) that is more flexible and/or simpler than JSON or other grammatically rigid languages. The looser format may make the custom computer language easier for the LLM to work in. The system can include an instruction for how the LLM should format the response to be in the custom computer language. The custom computer language can be a first computer language or target computer language, and JSON or some other computer language can be a second computer language, conventional computer language, or final computer language. As noted above, the custom computing language can reduce a total number of tokens in the prompt. The LLM may allow only a maximum number of tokens. Accordingly, the custom computer language can allow the data pipeline generation system 120 and/or the user to submit prompts that would otherwise include too many tokens and/or submit prompts that are more complex than other prompts.

FIGS. 2A-2B show examples of differences between a known computer language, such as JSON, and a custom computing language, which may have a less stringent or strict format. FIG. 2A shows an example set of code for executing a transformation, using a conventional language instruction 200. FIG. 2A includes only a portion of code for a executing the data transformation shown in FIG. 2B. In particular, FIG. 2A shows a portion of an example of a conventional language instruction 200 for performing a "complexLeftJoin" transformation. The full text of the conventional language instruction 200 may be 30, 40, 50, 60, or more lines of code and/or 100s, 1000s, or 10000s of tokens. A left join transformation can include combining one or more columns of data (e.g., the left data columns) from two or more data sets. In a custom computer language, one or more of the columns to be joined may need to be identified by a corresponding (and possibly a defined) identifier. Corresponding values from other columns from corresponding data sets may be included after the transformation. The conventional language instruction 200 can specify which data (e.g., of each of the left columns and/or of any other columns) that is to be retained in the new data set. FIG. 2A shows the conventional language instruction 200 in JSON, but other conventional languages are possible. As shown, the conventional language instruction 200 requires several lines of code, including a highly nested structure (e.g., with many curly braces ("}", "{"), commas, semicolons, etc.).

FIG. 2B shows another example of a custom computer language instruction 250, according to some embodiments. In contrast to the conventional language instruction 200, the custom computer language instruction 250 shows how instructions for presenting the data can be simplified in terms of the number of characters and/or tokens are required to indicate the instruction and/or in terms of the human readability of the instruction. For example, the custom computer language instruction 250 can refer to code-specific terms using quotation marks (e.g., "address_update", "claims", "postcodes", etc.) or without the quotation marks (e.g., address_update, claims, postcodes, etc.). Accordingly, the custom computer language instruction 250 can instruct the LLM to be more flexible in what constitutes acceptable punctuation or formatting than might be otherwise acceptable in a custom computer language, such as JSON. The shown custom computer language does not require sets of punctuation (e.g., curly braces, curly brackets, colons, commas, semicolons, periods, quotation marks, line breaks, white space). The custom computer language instruction 250 can also instruct how the response should be formatted or output. In some embodiments, the custom computer language instruction 250 can be a portion of a user interface.

The transformation instruction portion of the custom computer language instruction 250 can provide simplified descriptors of the columns to be joins. For example, the custom computer language instruction 250 indicates that "left=claims" and "right=address_update". The custom computer language instruction 250 may be the instruction that is received from (e.g., output by) the LLM. The custom computer language instruction 250 may be parsed by a local parser that is configured to identify the instructions in the custom computer language instruction 250 and/or translate the results of the parsing into another computer language (e.g., a conventional computer language). The custom computer language instruction 250 includes a conditional argument as "joinCondition=equals(left=$"left.claimant_id" right=$"right.claimant_id"). This instruction may indicate, for example, that the left column should include the claims column and the right column should include the updated address column, but only if the left and right columns have the correct claimant identification. The custom computer language instruction 250 can include other details. As shown, the custom computer language instruction 250 includes a filter transformation instruction as well. The custom computer language instruction 250 includes a WRITE instruction as well. The WRITE instruction can result in the creation of the new data set.

The format of the custom computer language can be looser and/or more flexible (e.g., less strictly enforced) than conventional or other known computer languages, such as JSON. For example, the format may include a more flexible grammar or grammatical structure, a more flexible syntax, a more flexible terminology, and/or another more flexible aspect of the format. A more flexible grammar can include fewer punctuation rules, fewer rules surrounding white space and/or line spacing, more options for satisfying the grammatical structure. A more flexible syntax can include more flexible rules or requirements for how an arrangement of substantive symbols (e.g., words, phrases). A more flexible terminology can include less strict rules for which terms will achieve a desired result. For example, synonyms of words and/or phrases may be used in the custom computer language to still fulfill the target instructions. As shown, the number of tokens (e.g., including the curly braces, different lines of code, quotation marks, commas, etc.) is substantially smaller than the number of tokens in the conventional language instruction 200 of FIG. 2A.

FIG. 3A shows an example of a first parser initializer 300, which can be included as part of a prompt, according to some embodiments. The first parser initializer 300 can be configured to initialize a parser that can interpret instructions or other aspects of the response from the LLM. The parser may be initialized using ANTLR or another parser generator. The first parser initializer 300 can identify a grammar that specifies a language and generates as output source code for a recognizer of that language. Although ANTLR is shown in first parser initializer 300, the first parser initializer 300 may include other languages, such as Ada95, ActionScript, C, C#, Java, JavaScript, Objective-C, Perl, Python, Ruby, and/or Standard ML, Go, PHP, and/or Swift. In some embodiments, the first parser initializer 300 can be a portion of a user interface.

The first parser initializer 300 can include a context-free grammar. The first parser initializer 300 can generate lexers, parsers, tree parsers, and/or combined lexer-parsers. Parsers may be configured to generate parse trees or abstract syntax trees, which may be further processed with tree parsers. The first parser initializer 300 can generate a recognizer for the language defined by the grammar (e.g., a program that reads a response from the LLM and/or generates an error if the input stream does not conform to the syntax specified by the grammar). If there are no syntax errors, the default action is to simply exit without printing any message. In order to do something useful with the language, actions can be attached to grammar elements in the grammar. These actions are written in the programming language in which the recognizer is being generated. When the recognizer is being generated, the actions can be embedded in the source code of the recognizer.

The first parser initializer 300 can specify a grammar name (e.g., "Arthur") and one or more expressions (e.g., readBlock, writeBlock, transformBlock). The first parser initializer 300 can additionally or alternatively specify available inputs, such as available Boolean inputs (e.g., TRUE, FALSE). As noted below in FIG. 3B, available inputs for various terms, such as TRUE and/or FALSE, can be specified. The first parser initializer 300 can additionally or alternatively specify an acceptable grammar, such as how a "set" is identified (e.g., "OPEN_CURLY (primitiveParameter COMMA?)*CLOSE_CURLY;". Grammars for other expressions can additionally or alternatively be included, such as how a "list" or a "tuple" or a "columnExpression". FIG. 3B shows additional a second parser initializer 350, which may be included with the first parser initializer 300. The first parser initializer 300 and/or second parser initializer 350 may be included in the complete prompt that will be transmitted to the LLM, possibly included with the custom computer language instruction 250 described above and/or other elements described herein (e.g., the expression initializer 400, the mistake context instruction 450, the transformation initializer 500, the transformation initializer 550, the prompt context instruction 600, etc.). The first parser initializer 300 and/or the second parser initializer 350 can instruct the LLM how to format the response so that the system may accurately reconstruct the data pipeline based on the response in the custom computer language. In some embodiments, the second parser initializer 350 can be a portion of a user interface.

FIG. 4A shows an expression initializer 400, which can be a portion of a prompt, according to certain embodiments. The expression initializer 400 can be configured to provide examples to an LLM for what expressions are available and/or acceptable for use by the LLM when responding to the prompt in creating the data pipeline. The expression initializer 400 can include an expression context instruction 404 and/or one or more expression instructions 412*a-g*. The expression context instruction 404 include a natural language instruction that provides some background or contextual information for helping the LLM respond in a way that will be parsable by the parser. For example, the expression context instruction 404 may express that the LLM is about to receive a list of available and/or acceptable expressions. Additionally or alternatively the expression context instruction 404 may include instructions to respond using only expressions expressed in similar format. In some embodiments, the expression context instruction 404 can include a general example of a format of an expression (e.g., "expressionId(parameterId . . . )"). The expression initializer 400 can include or show a portion of a user interface in some embodiments.

Figures 4B, 4C:
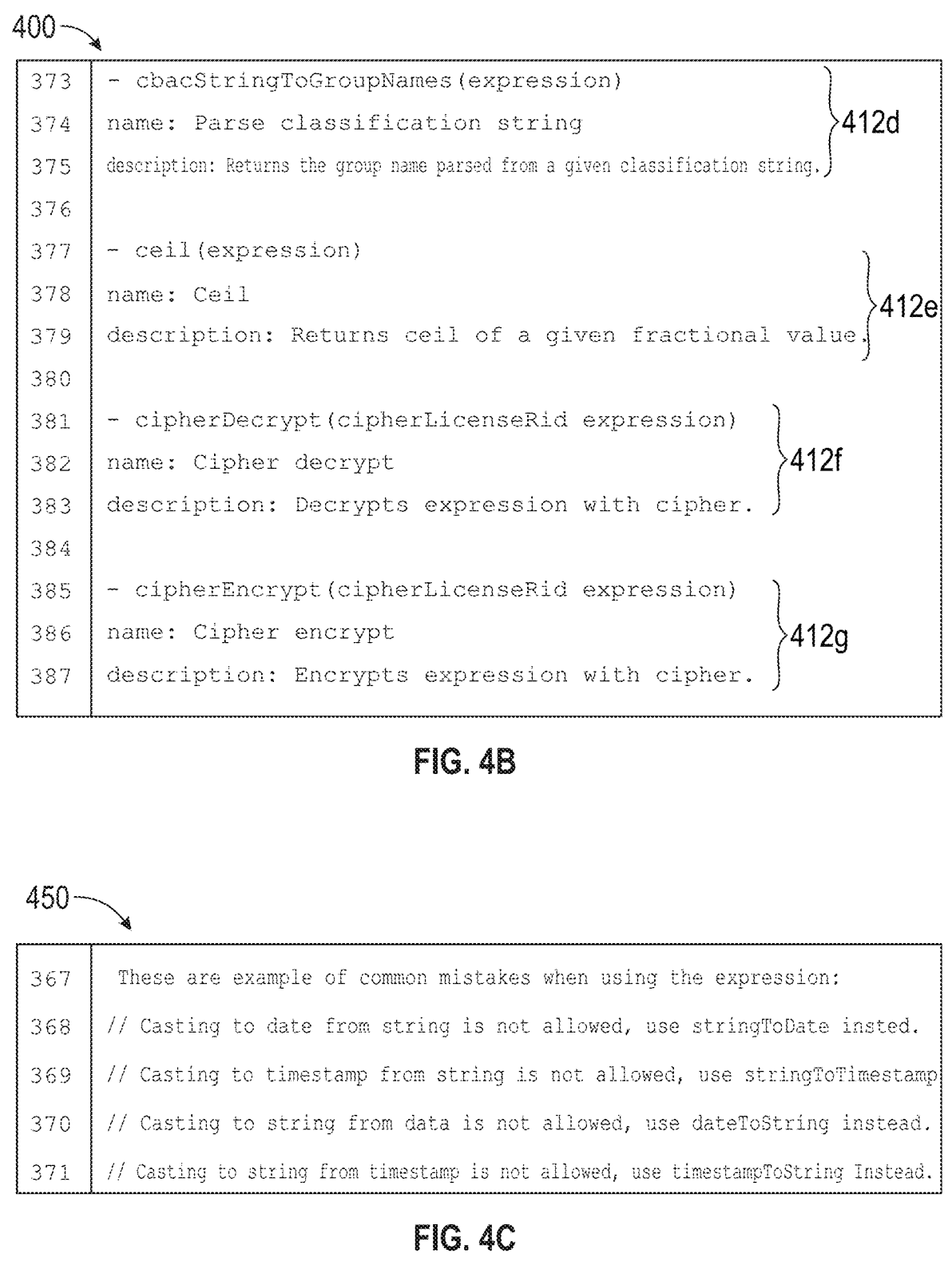

The expression instructions 412*a-g* can include a name of an expression, a description of what the expression performs, and/or examples of how the expression can be expressed by the LLM. Additionally or alternatively, a schema can be identified by the corresponding expression instruction 412*a-g*. A schema can serve as a blueprint for a format (e.g., grammar, punctuation, etc.) of the referenced expression. The schema may include a suggestion, such as "you could do" followed by an example use-case of the expression. FIG. 4B shows additional examples of expressions. Example expressions are shown in FIGS. 4A-4B, but are not an exhaustive list, can include an add expression, an and expression, an array contains expression, a cast expression, a parse classification string expression, a ceil expression, a cipher decrypt expression, a cipher decrypt, etc.

FIG. 4C shows an example mistake context instruction 450, according to some examples. The mistake context instruction 450 can provide examples of mistakes that may be used, but should be avoided, by a response to the prompt. The mistake context instruction 450 shown in FIG. 4C provides four such mistakes, such as casting to date from string, casting to timestamp from string, casting to string from date, and/or casting to string from timestamp. Such inclusion of a mistake context instruction 450 can help improve the response from the LLM, which may include responses that include fewer errors, mistakes of accuracy, mistakes of proper formatting, and/or other mistakes or errors. The mistake context instruction 450 can include or show a portion of a user interface in some embodiments.

Figure 5A:
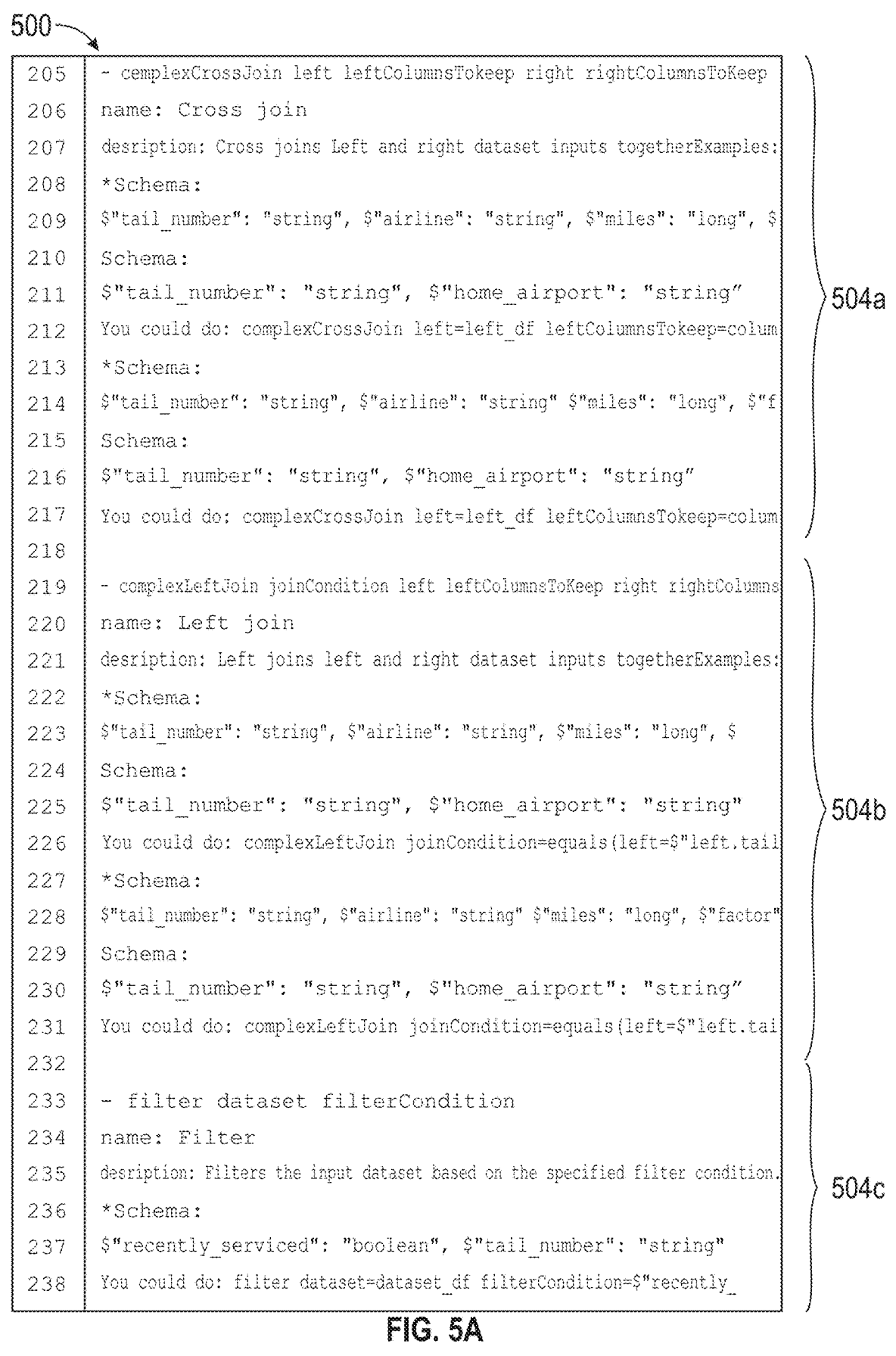

FIG. 5A shows an example transformation initializer 500 that may be included in a prompt to be sent to the LLM, according to some embodiments. The transformation initializer 500 can be configured to provide examples to an LLM for what transformations are available and/or acceptable for use by the LLM when responding to the prompt in creating the data pipeline. The transformation initializer 500 can include one or more transformation instructions 504*a-c*. The transformation instructions 504*a-c* can include a name of a transformation, a description of what the transformation performs, and/or examples of how the transformation can be expressed by the LLM. Although not shown in FIG. 5A, in some embodiments, a schema can be identified by the corresponding transformation instruction 504*a-c*. The schema can provide instructions or an indication of an acceptable format (e.g., grammar, punctuation, etc.) of the referenced transformation. The number of available transformations can be quite large and/or may be quite varied in their scope. Examples of possible transformations include join transformations, filter transformations, geojoin transformations (e.g., see below), group-by transformations, encode transformations, aggregation transformations, split transformations, modification transformations, move transformations, and/or any other transformation that can be used on a data set. The transformation initializer 500 can include or show a portion of a user interface in some embodiments.

Figure 5B:
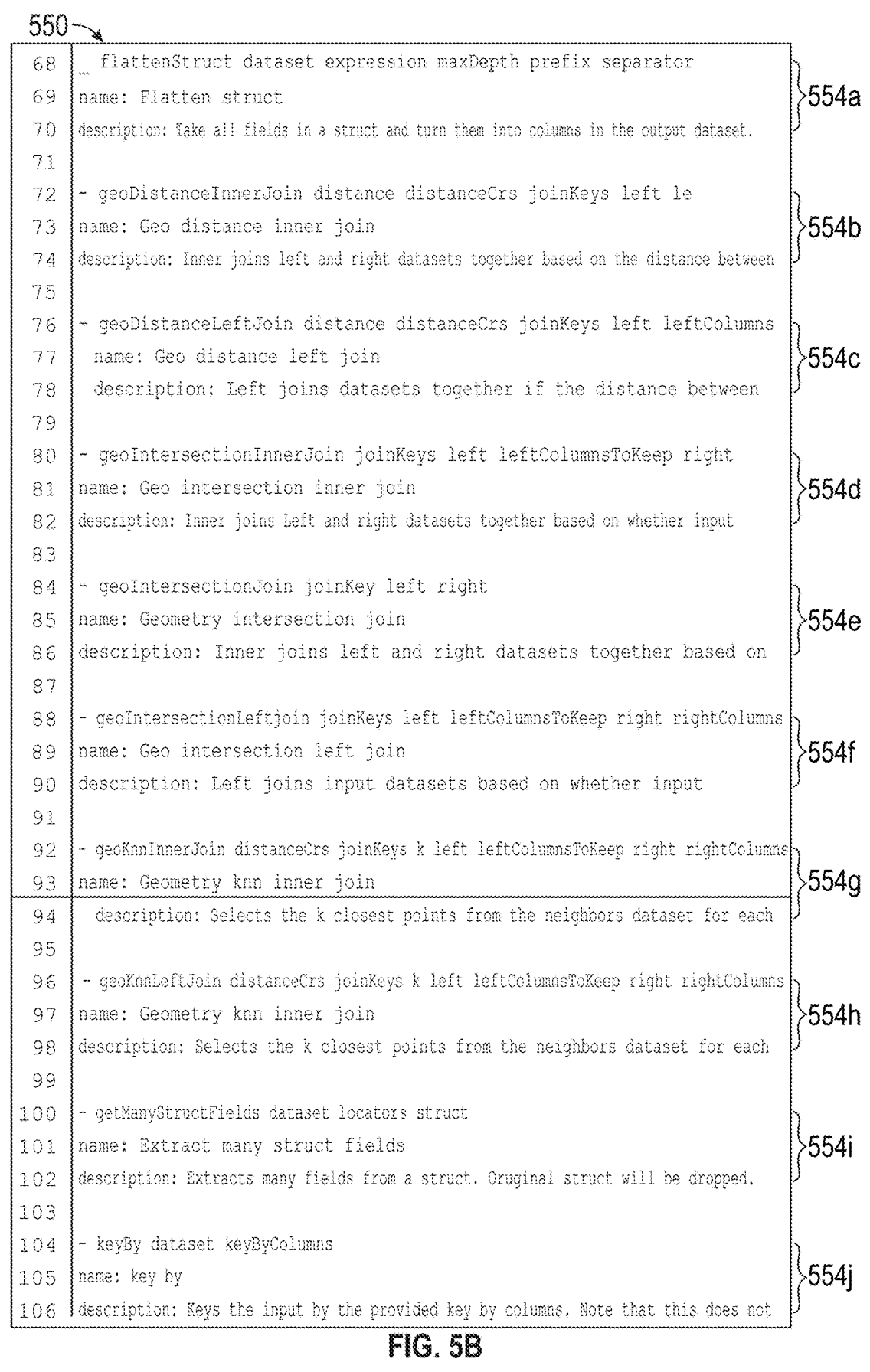

FIGS. 5B-5C show other example transformation initializers 550 that can be used to initialize geo-specific transformations. The transformation initializers 550 can include one or more features of the transformation initializer 500, such as being configured to provide examples of geo-specific transformations to an LLM for what transformations are available and/or acceptable for use by the LLM when responding to the prompt in creating the data pipeline. The transformation initializers 500 can include one or more transformation instructions 554*a-q*. The transformation instructions 554*a-q* can include a name of a transformation, a description of what the transformation performs, and/or examples of how the transformation can be expressed by the LLM in its response(s). The transformation instructions 554*a-q* can include one or more geo distance join transformations (e.g., joining and/or filtering data based on distances), geometry-based transformations (e.g., joining and/or filtering data based on a geometry), manipulating data based on H3 grid points, generating new points based on distances, and/or other geo-based transformations. The transformation initializers 550 can include or show a portion of a user interface in some embodiments.

As noted above (e.g., in FIG. 1), the system may include user interface (e.g., the user interface 130) in which a user can provide a prompt. The user interface can include a system prompt selector that allows a user to select a prompt to be sent to the LLM. The prompt may indicate generic instructions, such as, "Do as the user says". Additional remarks may be included in the prompt, such as a user-provided natural language query. The user interface can allow a user to create a long prompt comprising multiple paragraphs of specific instructions, examples of acceptable responses, logical explanations, instructions for formatting the response, and/or other aspects described herein. The instructions for formatting the response can include, for example, a custom computer language in which the response or part of the response should be written. The instructions can include examples of desired or required formatting (e.g., grammatical structure, syntax, terminology, etc.).

In some embodiments, the system may be configured to provide multiple prompts for multiple interactions (e.g., back and forth) between the system (e.g., the data pipeline generation system 120) and the LLM. It may be possible for the user to create a multiple-prompt "dialogue" with the LLM where a first task is addressed at a first step, a second task is addressed at a second step, and so forth. Such multi-step dialogue can serve as a kind of fine-tuning of responses from the LLM, where each step gets closer to a desired or target response. At one or more of those steps, one or more same or different tools may be used. The prompt and/or computer-based tool(s) identified by the user can influence how the response from the LLM is prepared, such as by signaling that more steps may be part of the complete analysis and that the current step is just one step of a multiple-step dialogue with the LLM.

In some embodiments, a user may be limited in how they can modify the prompt. For example, in some embodiments the user may only be allowed to provide the natural language query, which may be inserted into the prompt automatically by the system before being transmitted to the LLM. For example, in some implementations the system may supply the LLM with the system prompt. Each prompt may be substantially the same one sent to the LLM, perhaps with only the natural language query being modified each time. For example, the system prompt may be automatically selected and may not be selected by a user. The task prompt may be concatenated to or otherwise included with the natural language query to create the final prompt that is sent to the LLM.

FIG. 6 shows an example prompt context instruction 600 that may be provided as part of the full prompt, according to some examples. The prompt context instruction 600 can include many of the features of the prompt identified above. In some embodiments, the prompt context instruction 600 is not visible to a user but is added to the natural language query (which may be provided by the user via the user interface). The prompt context instruction 600 can include an expression context instruction 602, a transformation context instruction 604, an action context instruction 600, and/or a query example context instruction 612. The prompt context instruction 600 can be configured to prime the LLM to respond using the target custom computer language. Additionally or alternatively, the prompt context instruction 600 can provide the LLM with parameters for formatting its response so that the parser (described above) can properly interpret the response. The system may use the parser to generate the data pipeline from the LLM's response. The prompt context instruction 600 can be quite long and may include many lines of instructions. The prompt context instruction 600 may further include one or more of the instructions identified above (e.g., the expression initializer 400, the transformation initializer 500, etc.). The prompt context instruction 600 can include or show a portion of a user interface in some embodiments.

The expression context instruction 602 can include general instructions related to expressions, such as "You are allowed to use the same expression or transform more than once." The terms "transform" and "transformation" may be used interchangeably. The expression context instruction 602 may additionally or alternatively include additional instructions, such as "expressions should always be written as", followed by an example (e.g., expressionId (parameterId=parameter . . . )). The expression context instruction 602 can include explicit examples of expressions, such as "max(expression=$"column_name")".

The transformation context instruction 604 can include general instructions related to transformations. For example, the transformation context instruction 604 can include an instruction like "transforms should always be written as 'transformId parameterId=parameter . . . . AS dataset'. The transformation context instruction 604 can include one or more example transformations, such as "unionByName datasetsToUnion=[df1 df2 df3] AS unioned".

The action context instruction 600 can include general instructions corresponding to actions that the LLM may make. For example, as shown in FIG. 6, the action context instruction 600 states "all actions must include code written" and "must always respect the grammar provided above." Such general instructions can provide a further bulwark against errors in the output of the LLM response.

The query example context instruction 612 can provide additional instructions to the LLM about how to interpret what the LLM may see encounter in the rest of the prompt (of which the query example context instruction 612 may be a part), such as the natural language query. The query example context instruction 612 shown includes Examples. Each Example may include example terms that may be transmitted to the LLM and/or that the LLM may use in its computation and response, such as: Name, $"ID", $"description", $"start_date", and/or $"end_date".

The query example context instruction 612 includes an example Query ("Count rows by id") and/or an example Response. The example Response includes a "General thought" ("I need to count the number of rows in a dataset using an aggregate function"). The general thought can help the LLM better streamline its response by providing guideposts in the steps of its analysis. Additional Thoughts may be included, such as "I need to read the facilities dataset" or "I need to Aggregate on column ID and compute row count".

The query example context instruction 612 can additionally or alternatively include one or more Acts (e.g., "<code>READ "Facilities dataset" AS df;</code>") that can illustrate how the LLM may perform the analysis on a corresponding Thought. The query example context instruction 612 can include one or more Observations (e.g., "I have a dataset called df", "I have a dataset called df which counts rows by id"). The Observations can serve as reminders for the LLM about why certain data that is passed to the LLM may be useful and/or how it can be meaningfully used in the analysis for generating the response (and ultimately a data pipeline).

Figure 7A:
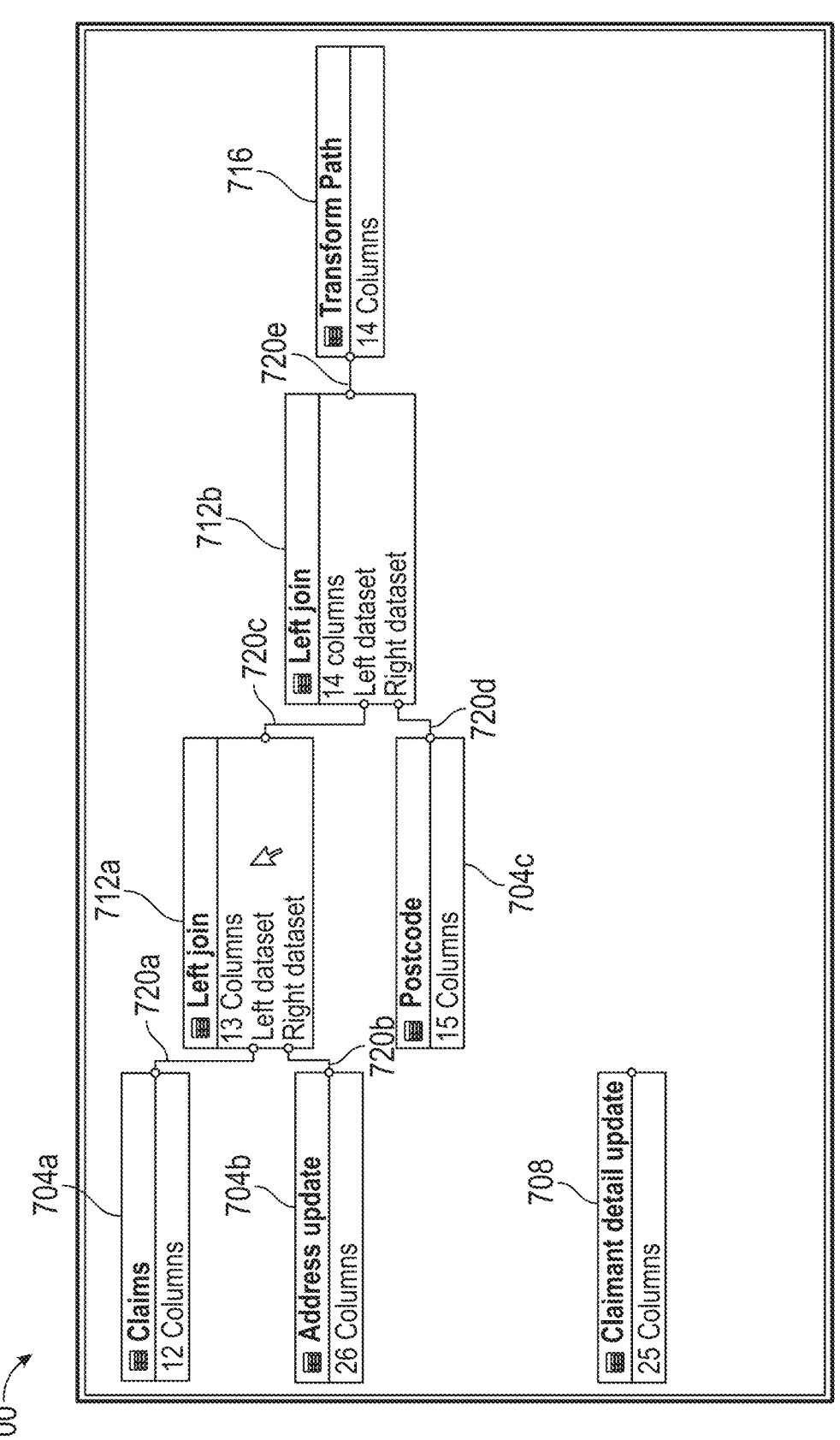
FIG. 7A shows an example data pipeline graph that may be generated by the system.

FIG. 7A shows an example data pipeline graph 700 that may be generated by the system (e.g., the data pipeline generation system 120). The data pipeline graph 700 may be displayed, such as via a user interface (e.g., the user interface 130). The data pipeline graph 700 can include a plurality of base data set nodes 704a-c. One or more of the base data set nodes 704a-c, such as base data set nodes 704a-b, may serve as indications of corresponding base data sets that can be selected by a user for generating one or more new data sets based on a transformation instruction, such as join result nodes 712a-b.

The base data set nodes 704a-b may be joined to form a first result node 712a. The connectors 720a-b can be lines or other indicators that show which base nodes were used to form the first result node 712a. As shown by the connectors 720a-b, data associated with the first base data set node 704a was joined as a left dataset while the second base data set node 704b was joined to form a right dataset of the first result node 712a. The first result node 712a is named "left join", which may be an indication of the transformation that was used to generate the first result node 712a.

As shown, the second join result node 712b was a result of a transformation on the first result node 712a and the third base data set node 704c. As indicated by the connectors 720c-d, data associated with the first result node 712a was used to form a left dataset of the second join result node 712b, and data associated with the third base data set node 704c was used to form a right dataset of the second join result node 712b.

A transformation may be executed on a single dataset. For example, as shown in FIG. 7A, a transform result node 716 may result from a transformation on the second join result node 712b. The relationship between the transformation, the second join result node 712b, and the transform result node 716 can be indicated by the connector 720e. An orphan data set node 708 is shown in FIG. 7A. Data associated with the orphan data set node 708 may be available for selection by a user and/or transformation, but as shown it has not been used to create any data pipeline.

Figure 7B:
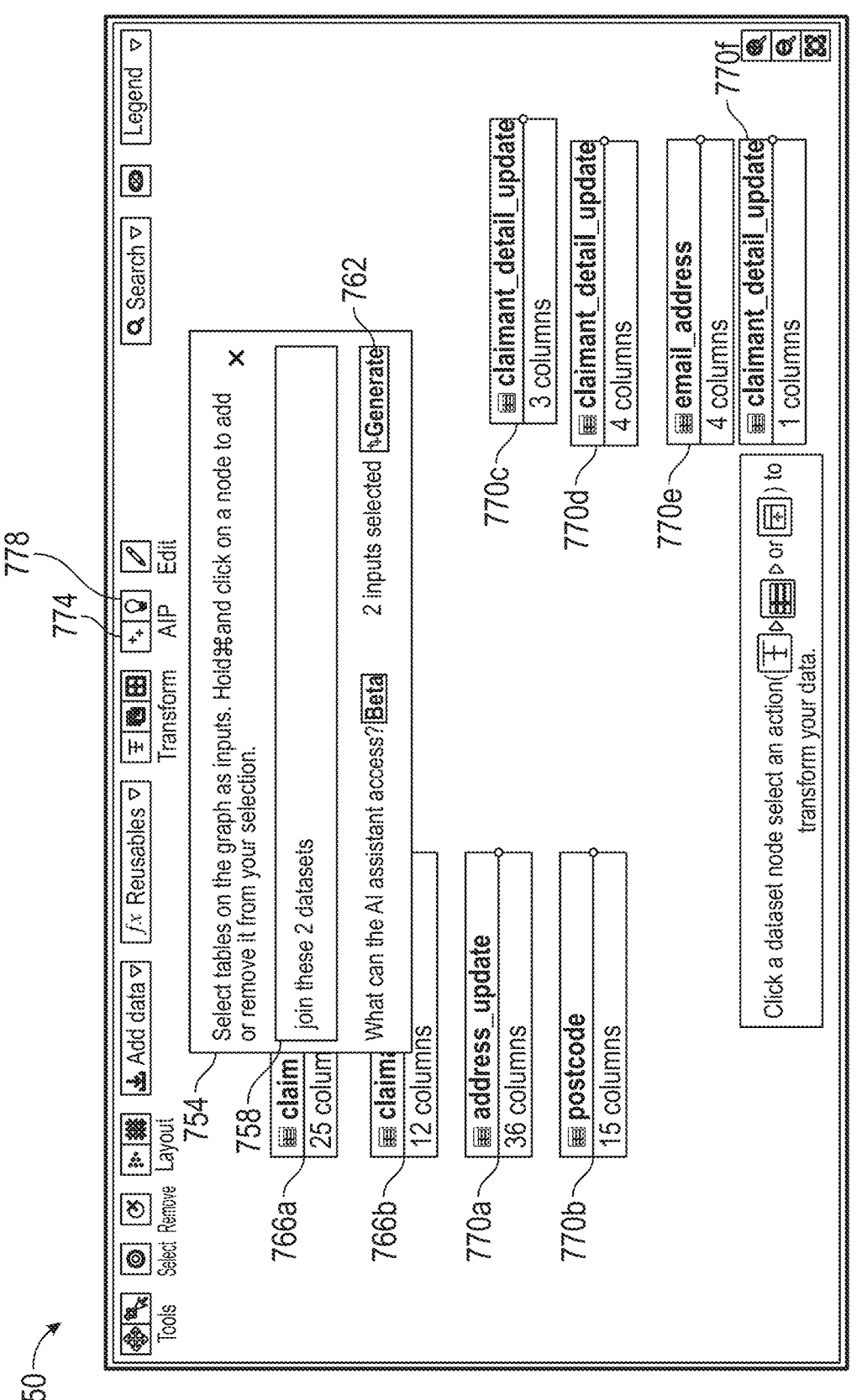
FIG. 7B shows an example data pipeline generation interface that can generate a data pipeline graph, such as the data pipeline graph of FIG. 7A.

FIG. 7B shows an example data pipeline generation interface 750 that can generate a data pipeline graph, such as the data pipeline graph 700 of FIG. 7A. The data pipeline generation interface 750 can include one or more selected data set nodes 766a-b and a data transformation selection interface 754. The data transformation selection interface 754 can include a data transformation selector 762. The data transformation selection interface 754 can allow a user to input a natural language query 758 (e.g., join these 2 datasets) and transmit the natural language query to an LLM via selection of the data transformation selector 762. The data pipeline generation interface 750 can include a transformation mode selector 774 that allows a user to cause display of the data transformation selection interface 754. As shown, the transformation mode selector 774 has been selected. Additionally or alternatively, the data pipeline generation interface 750 may include an explanation mode selector 778 (see FIG. 7E). The data pipeline generation interface 750 can include other nodes, such as the unselected data set nodes 770*a-f.*

Figure 7C:
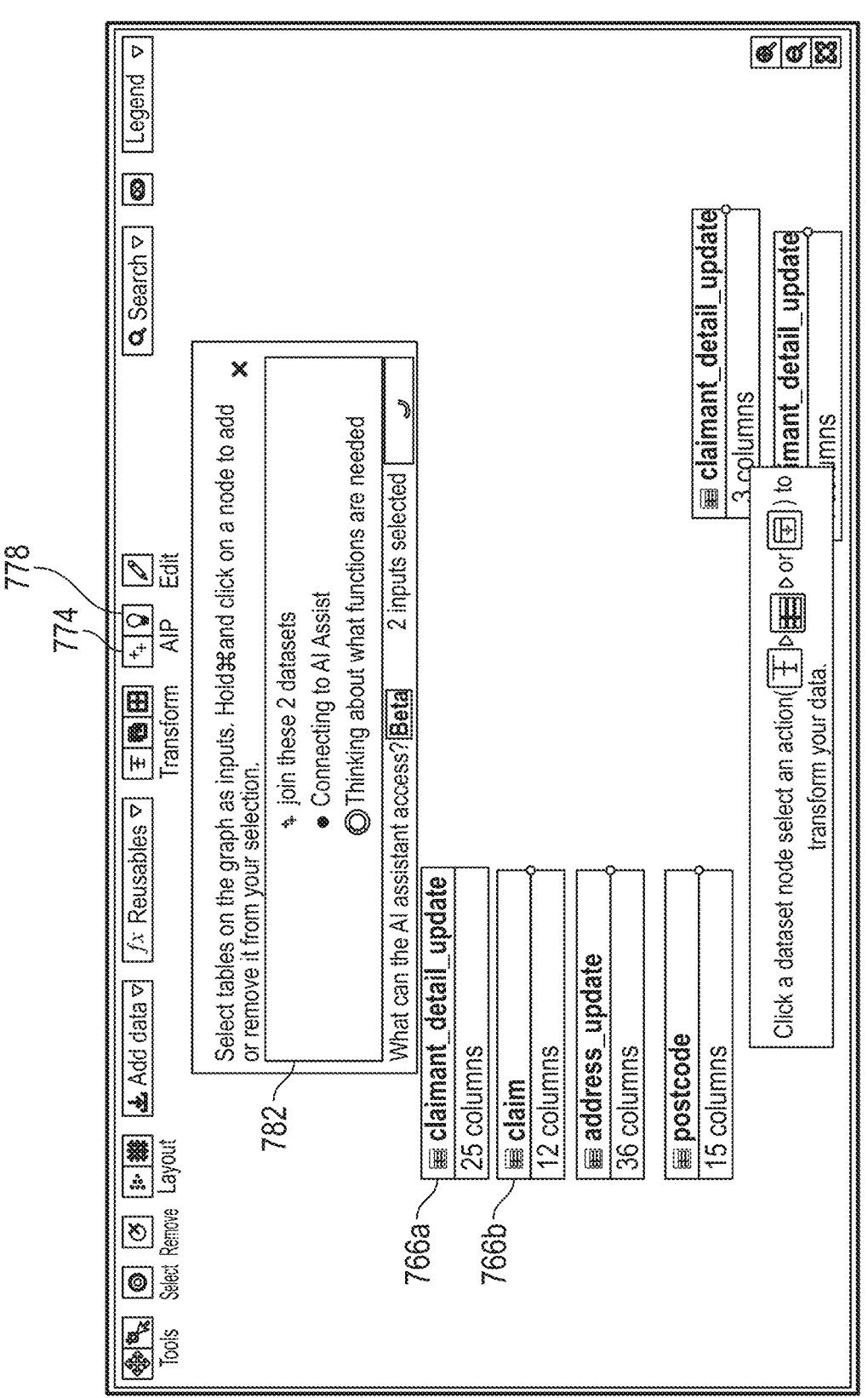
FIG. 7C shows an example transformation status indicator after a prompt has been transmitted to the LLM.

Once a user selects the selected data set nodes 766*a-b,* provides the natural language query 758, and selects the data transformation selector 762, a prompt may be generated and sent to the LLM. As explained herein, the prompt can include many elements and may be quite long and detailed. For example, the prompt can include the natural language query 758, the data sets corresponding to the selected data set nodes 766*a-b,* and/or one or more of the features described herein (e.g., the custom computer language instruction 250, the first parser initializer 300, the second parser initializer 350, the transformation instructions 504*a-c,* the transformation instructions 554*a-q,* etc.). FIG. 7C shows an example transformation status indicator 782 after a prompt has been transmitted to the LLM. The prompt may include one or more details and/or instructions as described herein. For example, the prompt may include the details of the data transformation selection interface 754. In response to the transmission of the prompt to the LLM, a transformation status indicator 782 may be displayed in the data pipeline generation interface 750. The transformation status indicator 782 can provide a status of the user's query or request. For example, as shown in FIG. 7C, the transformation status indicator 782 can indicate that the system is connecting to an AI Assist and thinking about what functions are needed. The AI Assist may be included in the system (e.g., the data pipeline generation system 120) and may be configured to join the natural language query to the ultimate prompt to be transmitted to the LLM. The "functions" can refer broadly to computer functions. Additionally or alternatively, the term functions may include expressions and transformations described herein.

Figure 7D:
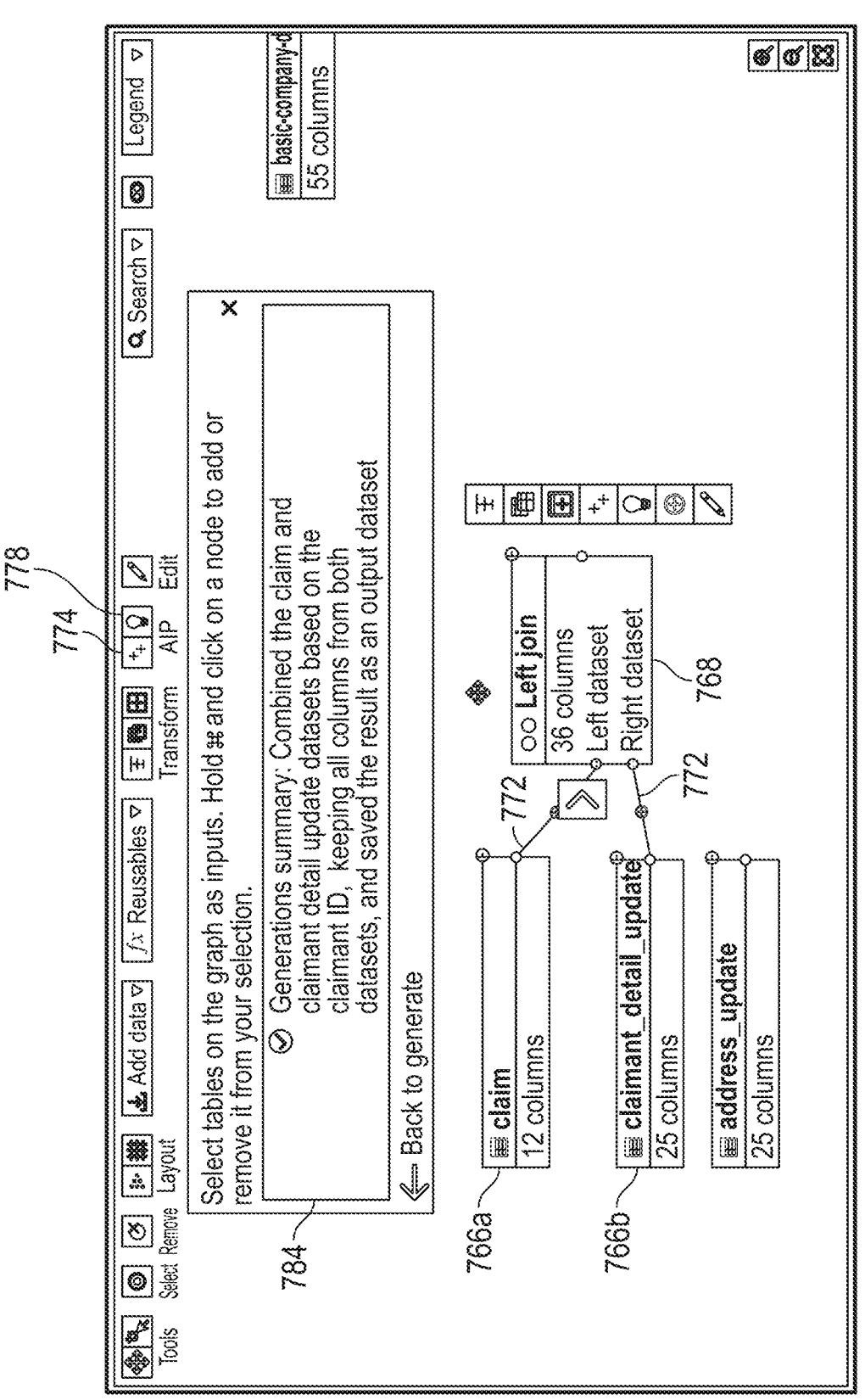
FIG. 7D shows a result of a join transformation prompt to an LLM to form a data pipeline.

Once the system has received a response from the LLM, the data pipeline generation interface 750 can generate a resulting new node, such as join result node 768, which can correspond to a new dataset. FIG. 7D shows a result of a join transformation prompt to an LLM to form a data pipeline. As shown, the selected data set nodes 766*a-b* form a data pipeline with the join result node 768. The connectors 772 show that data from the first selected data set node 766*a* corresponds to a left column of the data of the join result node 768. Data from the second selected data set node 766*b* was used to form data for a right dataset corresponding to the join result node 768. As shown, the data pipeline generation interface 750 includes a transformation result indicator 784 that explains what the system did in response to the prompt. The transformation result indicator 784 shown in FIG. 7D indicates that the system "combined the claim and claimant detail update datasets based on the claimant ID, keeping all columns from both datasets, and saved result as an output dataset."

Figure 7E:
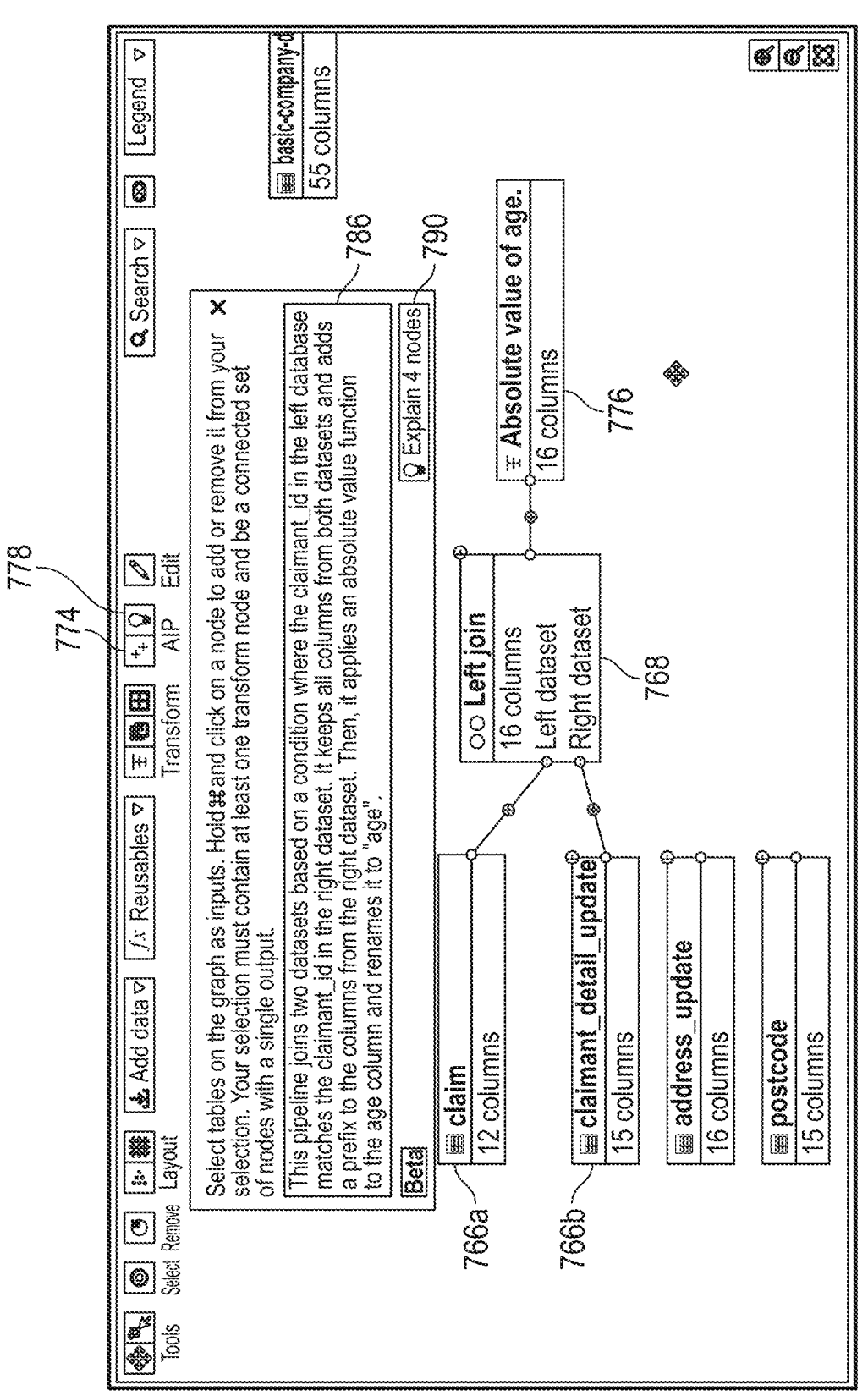
FIG. 7E shows an example of user selection and use of the explanation mode selector.

FIG. 7E shows an example of user selection and use of the explanation mode selector 778. As shown, a user has selected four nodes (the selected data set nodes 766*a-b,* the join result node 768, and a transform result node 776). As shown, an explanation result indicator 786 can appear in response to user selection of one or more nodes and an explanation selector 790. The explanation mode selector 778 can allow a user to learn about what a relationship among and/or purpose of one or more nodes is. Sometimes it may not be clear how or why various nodes are linked to each other in a data pipeline. Thus, the explanation mode may allow a user to identify such a relationship and/or purpose quickly and easily.

Figure 7F:
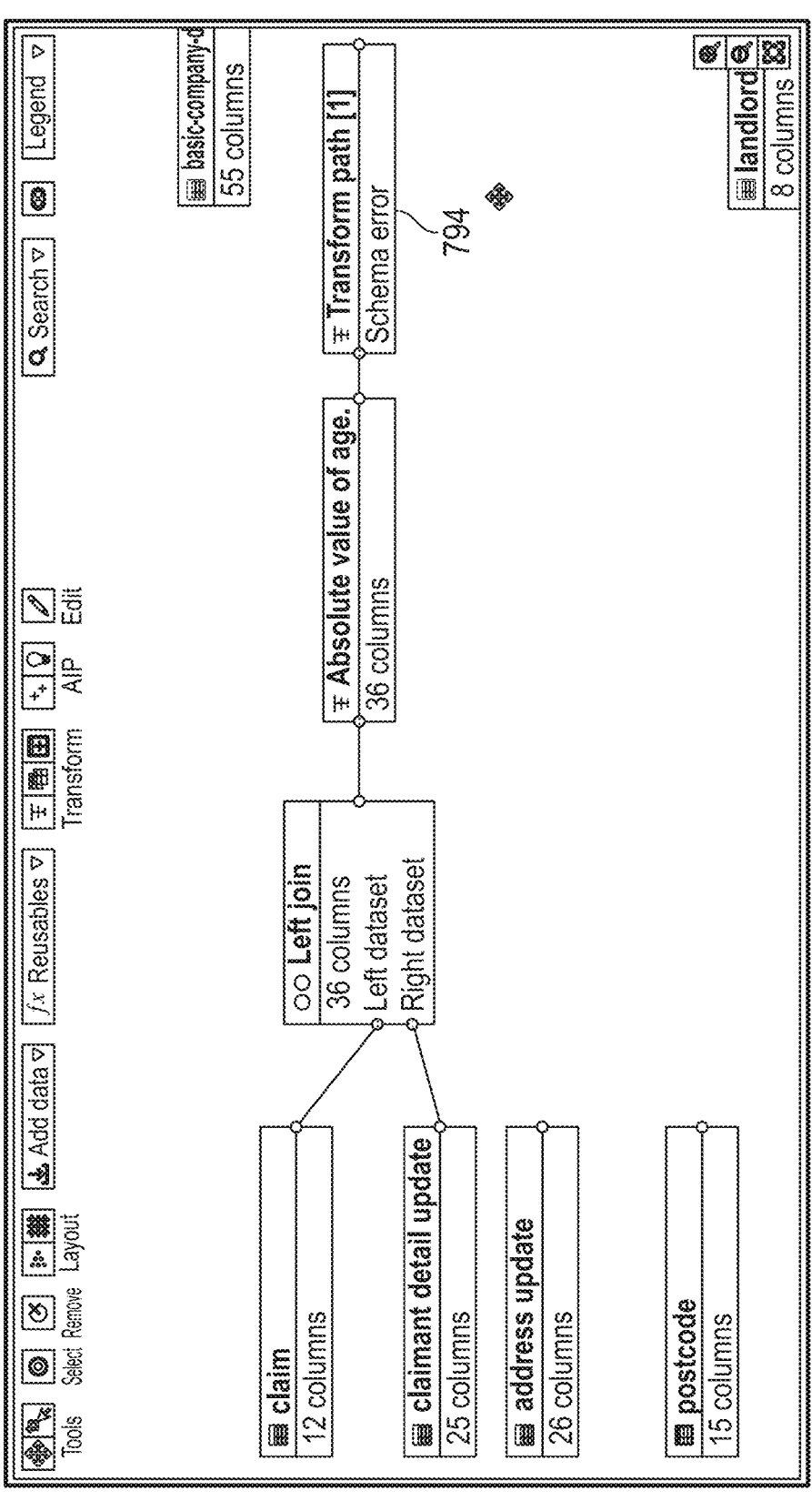
FIG. 7F shows an example error node.

In some cases, a mistake may arise in response to a user selection of the data transformation selector 762. A user may wish to create a new data set, a new data pipeline, and/or a new node. However, a mistake in the prompt (e.g., in the natural language query 758) may cause an error. The error may arise at the level of the prompt and/or at the level of the response from the LLM. For example, the natural language query may be misunderstood by the LLM (e.g., unclear, internally inconsistent, etc.), resulting in an error response. The data pipeline generation interface 750 can indicate this using an error node 794. FIG. 7F shows an example error node 794. The error node 794 may indicate a type of error, such as a schema error, a transformation error, a logic error, and/or some other kind of error. The error node 794 can allow a user to troubleshoot the natural language query, the prompt (or another portion thereof, such as described above), the underlying dataset(s), and/or some other aspect of the data pipeline.

FIG. 8 shows an example of a method 800 for generating a data pipeline using an LLM. The example routines or methods herein illustrate various implementations of systems described herein (e.g., the data pipeline generation system 120). The blocks of the routines illustrate example implementations, and in various other implementations various blocks may be rearranged, and/or rendered optional. Further, various blocks may be omitted from and/or added to the example routines below, and blocks may be moved between the various example routines.

At block 804, the system can receiving a natural language query and a selection of a plurality of data sets for generating a data pipeline. The query may be received via a user interface, such as the user interface 130. The query can be tailored to be received by a target LLM, which may be configured to receive a query in a natural language.

At block 808, the system can generate a prompt comprising at least: the natural language query, indications of the plurality of data sets, an indication of a format of a first computer language, and an indication of available data transformations. The indication of the format can include an example of a grammar or grammatical structure or other instructions for how the grammatical structure of the custom computer language operates. Additionally or alternatively, the indication of the format can include examples and/or other instructions for what constitutes a proper syntax (e.g., acceptable punctuation, acceptable phrasing and/or ordering of terms). Additionally or alternatively, the indication of the format can include examples and/or other instructions for acceptable terminology in the custom computer language. The indication of the format can include a list of available terms, examples of acceptable instructions, and/or a schema for responding to the prompt. The indication of the format may be automatically provided and/or via a user selection via a user interface.

The natural language query may include a natural language query received via a user interface (e.g., user interface 130, data pipeline generation interface 750). The natural language query may cause the system to generate a custom computer language instruction (e.g., the custom computer language instruction 250) based on the natural language query, based on the selection of indications of the plurality of data sets, and/or based on the other portions of the prompt described herein. The indications of the plurality of data sets can include a selection of a display of nodes (e.g., base data set nodes 704*a-b*) corresponding to respective data sets for generating a data pipeline. The indication of the format of the first computer language can include one or more parser initializers (e.g., the first parser initializer 300, the second parser initializer 350) and/or other indications of a format of a custom computer language. Additionally or alternatively, the indication of the format can include an a grammar, a list of available terms, examples of acceptable instructions, and/or a schema for responding to the prompt.

The indications of available data transformations can include various transformation instructions (e.g., transformation instructions 504*a-c*, transformation instructions 554*a-q*). The indication of the available data transformations can be presented in one or more formats. For example, the indication of the available data transformations can include one or more of a textual list of the available transformations, one or more explanations of the available transformations, one or more examples of the available transformations, formatting of the available transformations according to the custom computer language, and/or some other way of indicating the available data transformations.

At block 812, the system can transmit the prompt to a large language model ("LLM"). The prompt can include the natural language query, the indication of the format, the indication of the one or more computer-based tools, and/or other features of a prompt described herein. At block 816, the system can receive from the LLM a response to the prompt. The response can be (and, based on the features/instructions of the prompt, should be expected to be) in the format of the first computer language. At block 820, the system can parse the response in the first computer language to identify at least an indication of one or more recommended data transformations to be performed in the data pipeline and/or an indication of a new data set. The system may use the indication of the new data set to generate or output a visual display of a data pipeline graph. Additionally or alternatively, the system may generate an answer to the natural language query in a natural language. The new data set may include some data from one or more selected data sets (e.g., via a graphical user interface, such as the data pipeline generation interface 750). In some embodiments, the system may generate nodes corresponding to respective of the plurality of data sets and/or the new data set. The system can display at least one connector between at least one of the plurality of data sets and the new data set (e.g., FIGS. 7A-7E). The system may additionally or alternatively parse the response from the LLM to identify an indication of a second one or more transforms and an indication of a second new data set, such as when the data pipeline includes a plurality of resulting or new nodes.

At block 824, the system can generate, based on the indication of the one or more recommended data transformations, the data pipeline. The generation of the data pipeline may be done using a second computer language, such as a conventional computer language (e.g., JSON, ANTLR). Additionally or alternatively, the data pipeline can include the new data set. The generation of the data pipeline and/or the new data set can be based on the parsing of the response from the LLM.

In some embodiments, the system may receive (e.g., via the user interface) a second user selection of at least one of the plurality of data sets and of a second natural language prompt related to a function of at least one of the one or more transforms associated with the data pipeline. The system can transmit at least a portion of second query to the LLM. The second query can include the second natural language prompt and an indication of the at least one of the plurality of data sets. The system may receiving, from the LLM, a second response to the at least the portion of the second query. Based on the second response, the system may generate an indication of the function of the at least one of the one or more transforms associated with the data pipeline. This indication of the function may be an explanation of the function, such as the explanation result indicator 786. The indication of the function of the at least one of the one or more transforms may be displayed via the user interface.

Additional Example Implementations and Details Related to Computing Systems

In some implementations the systems described herein may comprise, or be implemented in, a "virtual computing environment". As used herein, the term "virtual computing environment" should be construed broadly to include, for example, computer-readable program instructions executed by one or more processors to implement one or more aspects of the modules and/or functionality described herein. Further, in this implementation, one or more services/modules/engines and/or the like of the system may be understood as comprising one or more rules engines of the virtual computing environment that, in response to inputs received by the virtual computing environment, execute rules and/or other program instructions to modify operation of the virtual computing environment. For example, a request received from a user computing device may be understood as modifying operation of the virtual computing environment to cause the request access to a resource from the system. Such functionality may comprise a modification of the operation of the virtual computing environment in response to inputs and according to various rules. Other functionality implemented by the virtual computing environment (as described throughout this disclosure) may further comprise modifications of the operation of the virtual computing environment, for example, the operation of the virtual computing environment may change depending on the information gathered by the system. Initial operation of the virtual computing environment may be understood as an establishment of the virtual computing environment. In some implementations the virtual computing environment may comprise one or more virtual machines, containers, and/or other types of emulations of computing systems or environments. In some implementations the virtual computing environment may comprise a hosted computing environment that includes a collection of physical computing resources that may be remotely accessible and may be rapidly provisioned as needed (commonly referred to as "cloud" computing environment).

Implementing one or more aspects of the system as a virtual computing environment may advantageously enable executing different aspects or modules of the system on different computing devices or processors, which may increase the scalability of the system. Implementing one or more aspects of the system as a virtual computing environment may further advantageously enable sandboxing various aspects, data, or services/modules of the system from one another, which may increase security of the system by preventing, e.g., malicious intrusion into the system from spreading. Implementing one or more aspects of the system as a virtual computing environment may further advantageously enable parallel execution of various aspects or modules of the system, which may increase the scalability of the system. Implementing one or more aspects of the system as a virtual computing environment may further advantageously enable rapid provisioning (or de-provisioning) of computing resources to the system, which may increase scalability of the system by, e.g., expanding computing resources available to the system or duplicating operation of the system on multiple computing resources. For example, the system may be used by thousands, hundreds of thousands, or even millions of users simultaneously, and many megabytes, gigabytes, or terabytes (or more) of data may be transferred or processed by the system, and scalability of the system may enable such operation in an efficient and/or uninterrupted manner.

Various implementations of the present disclosure may be a system, a method, and/or a computer program product at any possible technical detail level of integration. The computer program product may include a computer-readable storage medium (or mediums) having computer-readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer-readable storage medium (or mediums). Computer-readable storage mediums may also be referred to herein as computer-readable storage or computer-readable storage devices.

The computer-readable storage medium can be a tangible device that can retain and store data and/or instructions for use by an instruction execution device. The computer-readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. Computer-readable program instructions may be callable from other instructions or from itself, and/or may be invoked in response to detected events or interrupts. Computer-readable program instructions configured for execution on computing devices may be provided on a computer-readable storage medium, and/or as a digital download (and may be originally stored in a compressed or installable format that requires installation, decompression, or decryption prior to execution) that may then be stored on a computer-readable storage medium. Such computer-readable program instructions may be stored, partially or fully, on a memory device (e.g., a computer-readable storage medium) of the executing computing-device, for execution by the computing device. The computer-readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some implementations, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to implementations of the disclosure. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart(s) and/or block diagram(s) block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid-state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid-state drive) either before or after execution by the computer processor.

The flowcharts and block diagrams in the Figures illustrate the architecture, functionality, and operation of possible implementations of systems, methods, and computer program products according to various implementations of the present disclosure. In this regard, each block in the flowchart or block diagrams may represent a service, module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted or optional in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, and/or the like with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above implementations may generally (but not necessarily) be controlled and/or coordinated by operating system software, such as Mac OS, iOS, Android, Chrome OS, Windows OS (e.g., Windows XP, Windows Vista, Windows 7, Windows 8, Windows 10, Windows 11, Windows Server, and/or the like), Windows CE, Unix, Linux, SunOS, Solaris, Blackberry OS, VxWorks, or other suitable operating systems. In other implementations, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 9:
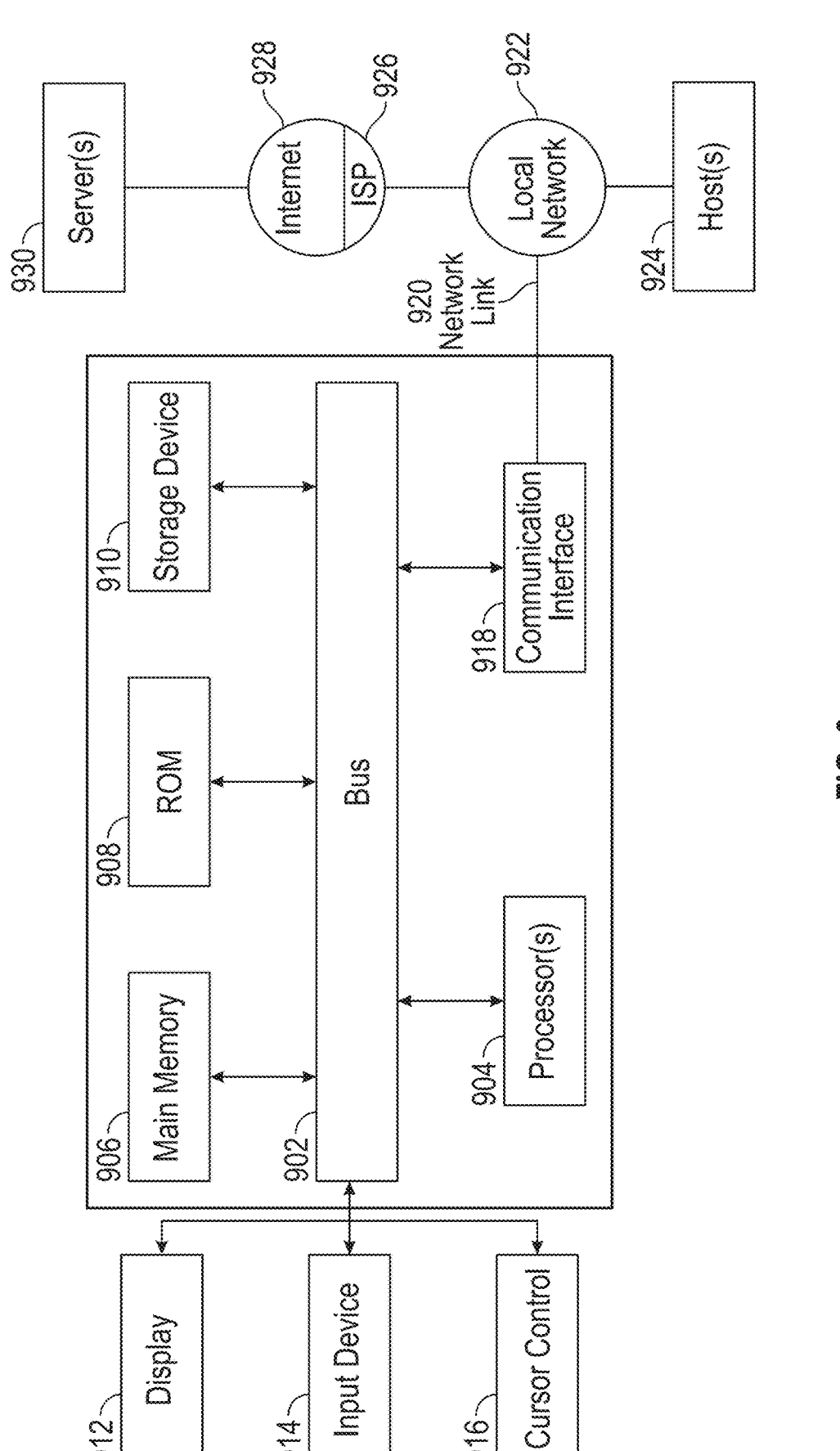
FIG. 9 is a block diagram that illustrates a computer system upon which various implementations may be implemented.

For example, FIG. 9 is a block diagram that illustrates a computer system 900 upon which various implementations may be implemented. For example, the computer system 900 may be implemented as the computing environment 100 (FIG. 1) in some implementations. Computer system 900 includes a bus 902 or other communication mechanism for communicating information, and a hardware processor, or multiple processors, 904 coupled with bus 902 for processing information. Hardware processor(s) 904 may be, for example, one or more general purpose microprocessors.

Computer system 900 also includes a main memory 906, such as a random access memory (RAM), cache and/or other dynamic storage devices, coupled to bus 902 for storing information and instructions to be executed by processor 904. Main memory 906 also may be used for storing temporary variables or other intermediate information during execution of instructions to be executed by processor 904. Such instructions, when stored in storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, such as a magnetic disk, optical disk, or USB thumb drive (Flash drive), etc., is provided and coupled to bus 902 for storing information and instructions.

Computer system 900 may be coupled via bus 902 to a display 912, such as a cathode ray tube (CRT) or LCD display (or touch screen), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane. In some implementations, the same direction information and command selections as cursor control may be implemented via receiving touches on a touch screen without a cursor.

Computing system 900 may include a user interface module to implement a GUI that may be stored in a mass storage device as computer executable program instructions that are executed by the computing device(s). Computer system 900 may further, as described below, implement the techniques described herein using customized hard-wired logic, one or more ASICs or FPGAs, firmware and/or program logic which in combination with the computer system causes or programs computer system 900 to be a special-purpose machine. According to one implementation, the techniques herein are performed by computer system 900 in response to processor(s) 904 executing one or more sequences of one or more computer readable program instructions contained in main memory 906. Such instructions may be read into main memory 906 from another storage medium, such as storage device 910. Execution of the sequences of instructions contained in main memory 906 causes processor(s) 904 to perform the process steps described herein. In alternative implementations, hard-wired circuitry may be used in place of or in combination with software instructions.

Various forms of computer readable storage media may be involved in carrying one or more sequences of one or more computer readable program instructions to processor 904 for execution. For example, the instructions may initially be carried on a magnetic disk or solid state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN (or WAN component to communicated with a WAN). Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution.

As described above, in various implementations certain functionality may be accessible by a user through a web-based viewer (such as a web browser), or other suitable software program). In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain implementations, one or more of the computing devices and/or systems of the disclosure may include mobile computing devices, and user interfaces may be accessible through such mobile computing devices (for example, smartphones and/or tablets).

Many variations and modifications may be made to the above-described implementations, the elements of which are to be understood as being among other acceptable examples. All such modifications and variations are intended to be included herein within the scope of this disclosure. The foregoing description details certain implementations. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain implementations include, while other implementations do not include, certain features, elements, and/or steps. Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain implementations require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While the above detailed description has shown, described, and pointed out novel features as applied to various implementations, it may be understood that various omissions, substitutions, and changes in the form and details of the devices or processes illustrated may be made without departing from the spirit of the disclosure. As may be recognized, certain implementations of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

EXAMPLE IMPLEMENTATIONS

Examples of implementations of the present disclosure can be described in view of the following example implementations. The features recited in the below example implementations can be combined with additional features disclosed herein. Furthermore, additional inventive combinations of features are disclosed herein, which are not specifically recited in the below example implementations, and which do not include the same features as the specific implementations below. For sake of brevity, the below example implementations do not identify every inventive aspect of this disclosure. The below example implementations are not intended to identify key features or essential features of any subject matter described herein. Any of the example clauses below, or any features of the example clauses, can be combined with any one or more other example clauses, or features of the example clauses or other features of the present disclosure.

In a 1st Example, a computer-implemented method for generating a data pipeline using a large language model, the method comprising: receiving, via a user interface, a natural language query and a selection of a plurality of data sets for generating a data pipeline; generating a prompt comprising at least: the natural language query, indications of the plurality of data sets, an indication of a format of a first computer language, and an indication of available data transformations; transmitting the prompt to a large language model ("LLM"); receiving, from the LLM, a response to the prompt in the format of the first computer language; parsing the response in the first computer language to identify at least an indication of one or more recommended data transformations to be performed in the data pipeline; and generating, based on the indication of the one or more recommended data transformations, the data pipeline using a second computer language.

In a 2nd Example, the method of Example 1, wherein the user interface comprises a graphical user interface, and wherein the natural language prompt and the selection of a plurality of data sets are received via the graphical user interface.

In a 3rd Example, the method of Example 2, wherein receiving the selection of the plurality of data sets comprises receiving, via the graphical user interface, user selection of indications of the plurality of data sets.

In a 4th Example, the method of Example 3, further comprising generating, in response to the user selection of the indications of the plurality of data sets, a prompt selector within the graphical user interface.

In a 5th Example, the method of Example 4, wherein receiving the natural language prompt comprises receiving user input via the prompt selector.

In a 6th Example, the method of any of Examples 1-5, further comprising: receiving, via the user interface, a second user selection of at least one of the plurality of data sets and of a second natural language prompt related to a function of at least one of the one or more transforms associated with the data pipeline; transmitting at least a portion of second query to the LLM, the second query comprising the second natural language prompt and an indication of the at least one of the plurality of data sets; receiving, from the LLM, a second response to the at least the portion of the second query; and generating, based on the second response, an indication of the function of the at least one of the one or more transforms associated with the data pipeline.

In a 7th Example, the method of Example 6, wherein generating the indication of the function of the at least one of the one or more transforms associated with the data pipeline comprises displaying, within the user interface, the indication of the function of the at least one of the one or more transforms.

In an 8th Example, the method of any of Examples 1-7, wherein the indication of the format of the first computer language and the indication of available transforms are received via the user interface.

In a 9th Example, the method of any of Examples 1-8, wherein the indication of the format of the first computer language comprises an indication of a plurality of acceptable natural language terms.

In a 10th Example, the method of Example 9, wherein each of the plurality of acceptable natural language terms comprise a common root term each having a different spelling, a different capitalization, and/or a different punctuation from another of the plurality of acceptable natural language terms.

In a 11th Example, the method of any of Examples 1-10, wherein the indication of the format comprises an indication of a grammar of the first computer language.

In a 12th Example, the method of any of Examples 1-11, wherein parsing the response in the first computer language further comprises identifying an indication of a new data set, and wherein the data pipeline comprises the new data set.

In a 13th Example, the method of Example 12, wherein generating the data pipeline comprises displaying, within the user interface, indications of: nodes each corresponding to respective of the plurality of data sets and the new data set; and at least one connector between at least one of the plurality of data sets and the new data set.

In a 14th Example, the method of any of Examples 12-13, further comprising generating, based on the parsing of the response and the identified second query, a second data pipeline using the second computer language, the second data pipeline comprising the new data set.

In a 15th Example, the method of any of Examples 12-14, further comprising parsing the response in the first computer language to further identify: an indication of a second one or more transforms and an indication of a second new data set.

In a 16th Example, the method of any of Examples 12-15, further comprising: displaying, within the user interface, the data pipeline comprising the new data set.

In a 17th Example, the method of any of Examples 1-16, further comprising: displaying, within the user interface, indications of the plurality of data sets, wherein receiving the selection of the plurality of data sets comprises receiving user selection of graphical representations of the plurality of data sets.

In a 18th Example, the method of any of Examples 1-17, wherein the available data transformations comprise at least one of: a join transformation, a filter transformation, a geojoin transformation, a group-by transformation, an encode transformation, or an aggregation transformation.

In a 19th Example, the method of any of Examples 1-18, wherein the format of the first computer language comprises at least one of: a grammar, a list of available terms, examples of acceptable instructions, or a schema for responding to the prompt.

In a 20th Example, a system comprising: one or more computer-readable storage mediums comprising program instructions; and one or more processors configured to execute the program instructions to cause the system to perform the method of any of Examples 1-19.

In a 21st Example, one or more non-transitory computer-readable mediums comprising program instructions that are executable by one or more processors to cause one or more processors to perform the method of any of Examples 1-19.

What is claimed is:

1. A computer-implemented method for generating a data pipeline using a large language model, the method comprising:

receiving, via a user interface, a natural language query and a selection of a plurality of data sets for generating a data pipeline in a first computer language, wherein the first computer language is a typed computer language, and wherein a description of a data transformation in the first computer language comprises at least one of a typed expression or typed variable;

generating a prompt comprising at least: the natural language query, indications of the plurality of data sets, an indication of a format of a second computer language, and an indication of available data transformations, wherein the available data transformations comprise the data transformation, and wherein a second description of the data transformation in the second computer language is typeless;

transmitting the prompt to a large language model ("LLM");

receiving, from the LLM, a response to the prompt in the format of the second computer language;

parsing the response in the second computer language to identify at least an indication of one or more recommended data transformations to be performed in the data pipeline; and generating, based on the indication of the one or more recommended data transformations, the data pipeline using the first computer language.

2. The method of claim 1, wherein the user interface comprises a graphical user interface, and wherein the natural language prompt and the selection of a plurality of data sets are received via the graphical user interface.

3. The method of claim 2, wherein receiving the selection of the plurality of data sets comprises receiving, via the graphical user interface, user selection of indications of the plurality of data sets.

4. The method of claim 3, further comprising generating, in response to the user selection of the indications of the plurality of data sets, a prompt selector within the graphical user interface.

5. The method of claim 4, wherein receiving the natural language query comprises receiving user input via the prompt selector.

6. The method of claim 1, further comprising:

receiving, via the user interface, a second user selection of at least one of the plurality of data sets and of a second natural language prompt related to a function of at least one of the one or more recommended data transformations associated with the data pipeline;

transmitting at least a portion of second query to the LLM, the second query comprising the second natural language prompt and an indication of the at least one of the plurality of data sets;

receiving, from the LLM, a second response to the at least the portion of the second query; and generating, based on the second response, an indication of the function of the at least one of the one or more recommended data transformations associated with the data pipeline.

7. The method of claim 6, wherein generating the indication of the function of the at least one of the one or more recommended transforms associated with the data pipeline comprises displaying, within the user interface, the indication of the function of the at least one of the one or more transforms.

8. The method of claim 1, wherein the indication of the format of the second computer language and the indication of available data transformations are received via the user interface.

9. The method of claim 1, wherein the indication of the format of the second computer language comprises an indication of a plurality of acceptable natural language terms.

10. The method of claim 9, wherein each of the plurality of acceptable natural language terms comprise a common root term each having a different spelling, a different capitalization, and/or a different punctuation from another of the plurality of acceptable natural language terms.

11. The method of claim 1, wherein the indication of the format comprises an indication of a grammar of the first computer language.

12. The method of claim 1, wherein parsing the response in the second computer language further comprises identifying an indication of a new data set, and wherein the data pipeline comprises the new data set.

13. The method of claim 12, wherein generating the data pipeline comprises displaying, within the user interface, indications of:

nodes each corresponding to respective of the plurality of data sets and the new data set; and at least one connector between at least one of the plurality of data sets and the new data set.

14. The method of claim 12, further comprising generating, based on the parsing of the response and the identified second query, a second data pipeline using the second computer language, the second data pipeline comprising the new data set.

15. The method of claim 13, further comprising parsing the response in the second computer language to further identify: an indication of a second one or more recommended data transformations and an indication of a second new data set.

16. The method of claim 12, further comprising:

displaying, within the user interface, the data pipeline comprising the new data set.

17. The method of claim 1, further comprising:

displaying, within the user interface, indications of the plurality of data sets, wherein receiving the selection of the plurality of data sets comprises receiving user selection of graphical representations of the plurality of data sets.

18. The method of claim 1, wherein:

the indication of the available data transformations comprises at least one of: a textual list of the available data transformations, one or more explanations of the available data transformations, one or more examples of the available data transformations, or formatting of the available data transformations according to the second computer language;

the indication of the format of the second computer language comprises at least one of: a grammar, a list of available terms, examples of acceptable instructions, or a schema for responding to the prompt; and the prompt further comprises an indication of a schema.

19. A system comprising:

one or more computer-readable storage mediums comprising program instructions; and one or more processors configured to execute the program instructions to cause the system to perform the computer-implemented method of claim 1.

20. One or more non-transitory computer-readable storage mediums comprising program instructions, the program instructions executable by one or more processors to cause the one or more processors to perform the computer-implemented method of claim 1.

\* \* \* \* \*